(12) United States Patent
Koren et al.

(10) Patent No.: US 9,207,343 B2
(45) Date of Patent: Dec. 8, 2015

(54) MODEL-BASED TIME-PRESERVING TOMOGRAPHY

(75) Inventors: Zvi Koren, Raanana (IL); Allon Bartana, Moshav Matta (IL); Igor Ravve, Cesarea (IL)

(73) Assignee: Paradigm Sciences Ltd., Grand Cayman (KY)

( * ) Notice: Subject to any disclaimer, the term of this patent is extended or adjusted under 35 U.S.C. 154(b) by 1276 days.

(21) Appl. No.: 12/042,417

(22) Filed: Mar. 5, 2008

(65) Prior Publication Data
US 2008/0273421 A1    Nov. 6, 2008

Related U.S. Application Data

(60) Provisional application No. 60/904,801, filed on Mar. 5, 2007, provisional application No. 60/924,633, filed on May 23, 2007.

(51) Int. Cl.
*G01V 1/28* (2006.01)
*G01V 1/30* (2006.01)

(52) U.S. Cl.
CPC .............. *G01V 1/301* (2013.01); *G01V 1/282* (2013.01); *G01V 1/305* (2013.01); *G01V 2210/50* (2013.01); *G01V 2210/6222* (2013.01); *G01V 2210/64* (2013.01); *G01V 2210/66* (2013.01); *G01V 2210/671* (2013.01)

(58) Field of Classification Search
CPC ......... G01V 1/301; G01V 1/28; G01V 1/303; G01V 1/282; G01V 2210/50; G01V 2210/671; G01V 1/305; G01V 2210/64; G01V 2210/66; G01V 2210/6222

USPC ............. 73/596, 597; 367/11, 73, 14; 702/14, 702/16, 17, 18; 324/323; 703/5
See application file for complete search history.

(56) References Cited

U.S. PATENT DOCUMENTS

| | | | |
|---|---|---|---|
| 4,953,140 A | 8/1990 | Dablain | |
| 5,693,885 A * | 12/1997 | Neidell | 73/597 |
| 6,493,634 B1 * | 12/2002 | Krebs et al. | 702/14 |
| 6,643,590 B2 | 11/2003 | Wiggins | |
| 7,117,093 B2 * | 10/2006 | Stinson et al. | 702/14 |

OTHER PUBLICATIONS

S. K. L. Chiu, E. R. Kanasewich, S. Phadke "Three-dimensional determination of structure and velocity by seismic tomography" Geophysics, vol. 51, Issue 8, pp. 1559-1571 (Aug. 1986).

(Continued)

*Primary Examiner* — Daniel L Murphy
(74) *Attorney, Agent, or Firm* — Pearl Cohen Zedek Latzer Baratz LLP

(57) ABSTRACT

A system and method for modeling seismic data using time preserving tomography including storing an initial set of parameter values representing an initial seismic data model. The initial seismic model may correspond to at least two or more ray pairs. Each ray pair may have a traveltime. An altered model may be generated by altering two or more parameter values in the initial set of parameter values for each of two or more ray pairs in the initial model. Altering one parameter value without altering the remaining of the two or more parameter values may correspond to a change in the traveltime of each of the ray pairs, while altering the two or more parameter values in combination typically corresponds to no net change in the traveltime of each of the ray pairs.

26 Claims, 5 Drawing Sheets

(56) References Cited

OTHER PUBLICATIONS

Ru-Shan Wu, M. Nafi Toksöz "Diffraction tomography and multisource holography applied to seismic imaging" Geophysics, vol. 52, Issue 1, pp. 11-25 (Jan. 1987).

Peter Mora "Inversion = migration + tomography" Geophysics, vol. 54, Issue 12, pp. 1575-1586 (Dec. 1989).

V. Scott Phillips and Michael C. Fehler "Traveltime tomography: A comparison of popular methods" Geophysics, vol. 56, Issue 10, pp. 1639-1649 (Oct. 1991).

Marta Jo Woodward Wave-equation tomography, Geophysics, vol. 57, Issue 1, pp. 15-26 (Jan. 1992).

M. Ali C. Tura, Lane R. Johnson, Ernest L. Majer, and John E. Peterson "Application of diffraction tomography to fracture detection" Geophysics, vol. 57, Issue 2, pp. 245-257 (Feb. 1992).

Joseph P. Stefani "Turning-ray tomography" vol. 60, Issue 6, pp. 1917-1929 (Nov.-Dec. 1995).

Jerry M. Harris and Guan Y. Wang "Diffraction tomography for inhomogeneities in layered background medium" Geophysics, vol. 61, Issue 2, pp. 570-583 (Mar.-Apr. 1996).

Margaret J. Eppstein, David E. Dougherty "Optimal 3-D Traveltime Tomography" Geophysics 63(3): 1053-106, 1998.

Grechka Vladimir, Pech Andres, Tsvankin Llya "Multicomponent stacking-velocity tomography for transversely isotropic media" 2002, vol. 67, n°5, pp. 1564-1574 (29 ref.).

Stig-Kyrre Foss, Bjørn Ursin, Maarten V. De Hoop "Depth-consistent reflection tomography using PP and PS seismic data Geophysics", vol. 70, Issue 5, pp. U51-U65 (Sep.-Oct. 2005).

Bin Wang, Volker Dirks, Patrice Guillaume, François Audebert, Duryodhan Epili, "A 3D subsalt tomography based on wave-equation migration-perturbation scans Geophysics", vol. 71, Issue 2, pp. E1-E6 (Mar.-Apr. 2006).

Berryman, "Stable Iterative Reconstruction Algorithm for Nonlinear Traveltime Tomography", Inverse Problems, Institute of Physics Publishing, vol. 6, Feb. 1990.

* cited by examiner

MODEL-BASED TIME-PRESERVING TOMOGRAPHY

PRIOR APPLICATION DATA

The present application claims benefit of prior provisional application Ser. No. 60/904,801, filed on Mar. 5, 2007, and 60/924,633, filed on May 23, 2007, both of which are entitled "Model-Based Time-Preserving Tomography", both of which are incorporated by reference herein in their entirety.

FIELD OF THE INVENTION

The present invention relates to the alteration of model parameters such as subsurface geological models derived from seismic data for generating new altered models, for example by altering model parameters.

BACKGROUND OF THE INVENTION

Ideally, a set of seismic imaging data may be represented by a unique subsurface geological model. However, typically subsurface geological models derived from seismic imaging are not unique; that is, many combinations of subsurface geological model representations and model parameter values may be used to satisfy the same imaging conditions. Typically, this variation is due to limitations in acquiring the seismic data, such as, for example, small offset distances between sources and receivers and the limited range of azimuth coverage. Other factors contributing to the non-uniqueness of subsurface geological models are, for example: finite frequency band, noise, shadow zones, and limitations in the ray method and theory of wave propagation used (e.g., in which some factors are not accounted for, such as, anisotropy (directional dependency) or isotropy (directional independence), dispersion from attenuation, scattering, high frequency assumptions, etc.). Thus, deriving an accurate model is an interpretative process based on information obtained from seismic imaging, wells, and a priori geological knowledge. This process is typically very demanding, normally requiring massive computational power and intensive human involvement.

The resulting derived subsurface model normally consists of several million data points, each containing information about structure geometry and medium properties. Therefore, altering the model is typically a very complicated and laborious task.

A need exists for an accurate and efficient means for altering a subsurface geological model while minimizing computational barriers and the need for user input.

SUMMARY OF THE INVENTION

Embodiments of the invention include a system and method for modeling seismic data using time preserving tomography including storing an initial set of parameter values representing an initial seismic data model. The initial seismic model may correspond to at least multiple ray pairs. Each ray pair may have a traveltime. An altered model may be generated by altering two or more parameter values in the initial set of parameter values for each of multiple ray pairs in the initial model. Altering one parameter without altering the remaining of the two or more parameter values may correspond to a change in the traveltime of each of the ray pairs, while altering the two or more parameter values in combination typically corresponds to no net change in the traveltime of each of the ray pairs.

DESCRIPTION OF THE DRAWINGS

Various embodiments of the present invention are illustrated in the following drawings, which are meant to be exemplary only and are not limiting on the scope of the present invention, and in which.

Figure 1:
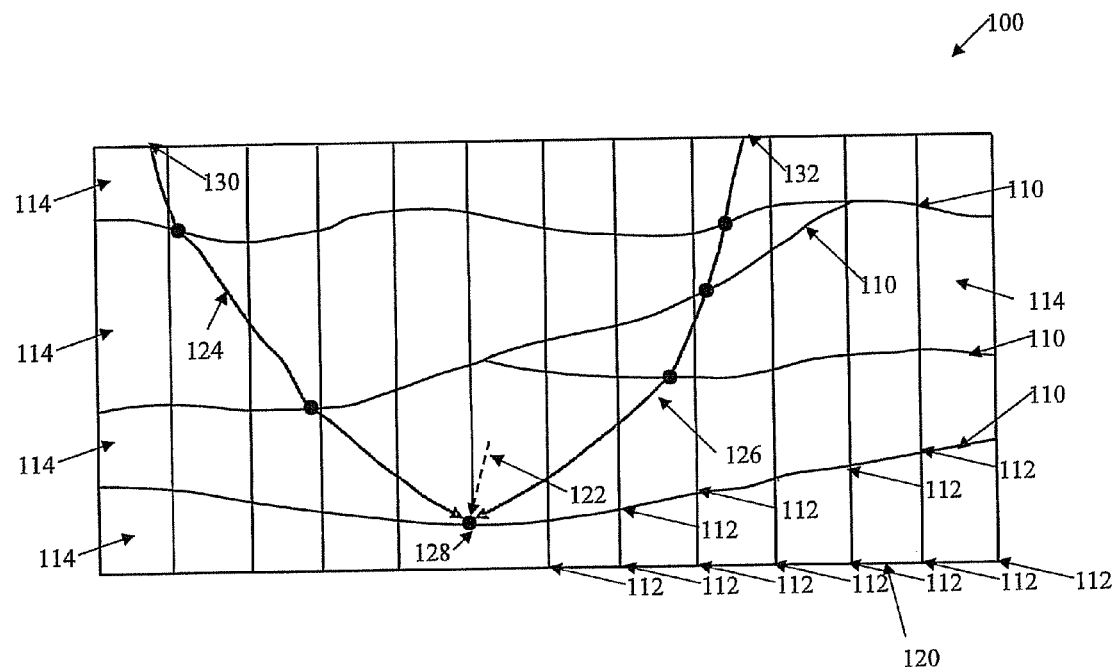
FIG. 1 is a schematic illustration of a seismic data model in accordance with an embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DESCRIPTION OF THE PREFERRED EMBODIMENT

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

A standard subsurface model may be an initial, generic, or basic representation of a set of seismic data to be used as a building block for each new representation of the set of seismic data. The standard subsurface model may be defined (e.g., at least in part) by an initial set of parameter values or kinematic characteristics. The initial set of parameter values typically includes initially estimated, basic, or inherent properties of the data being modelled (e.g., subsurface location, spatial relationships, medium properties, etc.). The initial set of parameter values may be arranged for example in a template matrix, Q.

Each new model of the seismic data may be defined by a template, base or standard model altered by alterations or perturbations to the standard model. Data for making the alterations may be arranged in for example a perturbation vector, X. The altered model (e.g., the traveltime in the altered model) may be generated by multiplication of the template matrix, Q, by the perturbation vector, X. Data or information for making alterations or perturbations may be stored in a data structure other than a perturbation vector.

In contrast with conventional methods, in which a new model of the set of seismic data is built "from scratch" for each alteration of the data, embodiments of the present invention may reuse the previously generated standard model data, saved, for example, in the template matrix, Q. The template matrix may be the building block from which all other models of the set of seismic data are generated. For example, each different perturbation vector, X, may be applied to the unique template matrix, Q, for building a new variation of a model of the same data. The different models may be compared for selecting the optimum model-building parameter values.

The initial model may be processed, for example, by a ray tracing mechanism, to generate at least a corresponding multiple ray pairs. Each ray pair corresponding to the initial model may have a traveltime (e.g., the time for a wave to propagate from a source to a receiver along the ray pair path). Since the subsurface model is derived from a set of seismic data, the traveltime computed along simulated reflected ray pairs are assumed to be correct. Thus, changes of individual model parameters must maintain those traveltimes. Any alteration of a set of model parameters may be accompanied by a corresponding alteration of the other set of parameters in order to preserve the total travel time along each of the ray pairs.

The altered model may be built from the initial model using time preserving tomography. In time preserving tomography, the total traveltime along ray pairs in the initial and the altered model should typically be the same. Typically, perturbations of individual initial model parameter values, such as a change in horizontal shift or medium properties, cause a change in the traveltime along the ray pairs of the resulting altered model. However, in time preserving systems, the altered model should have no such traveltime change. Thus, a tomographic mechanism may generate one or more additional perturbations causing a complementary (e.g., a cancelling or an equal and opposite) change in the traveltime along the ray pair of the altered model. Thus, applying the combined perturbations to the initial model may cause no total change in traveltime in the altered model (e.g., the traveltime between the models is preserved).

1. Standard Subsurface Model

Reference is made to FIG. 1, which is a schematic illustration of a seismic data model 100 in accordance with an embodiment of the present invention. Model 100 may be a three-dimensional (3D) spatial subsurface model. Model 100 may be generated by processing (e.g., raw) seismic data. The model 100 may be defined by a set of parameter values corresponding to each node 112 of the model. For example, parameter values may include values for locations of horizons 110 and properties of the TTI medium, such as, the axial compression velocity, $V_A$, and two Thomsen anisotropy parameters, epsilon and delta.

Model 100 may be processed by, for example, a ray tracing mechanism. A ray tracing mechanism may generate tomographic coefficients for generating ray pairs. Thus, the data in model 100 or data derived therefrom (e.g., tomographic coefficients) may correspond to at least ray pairs. The data in model 100 may correspond to data other than ray pairs, for example, a structural layout (e.g., size or a set of dimensions) of the model, computational (e.g., time preserving) relationships, etc. Each ray pair may include an incident ray 124 and a reflected ray 126 that meet at a reflection point 128. Each ray pair may be emitted from a source point 130 and collected at a receiver point 132. Each ray pair may have a traveltime, for example, the time for a wave to propagate from source point 130 to receiver point 132 along the path of the ray pair.

Model 100 may include a number of geological formations 114 separated by interfaces or horizons 110 (e.g., formed by the reflection point 128). The interfaces may be specified by spatial surfaces (e.g., horizons 110), which, in turn, may be defined by nodal points 112, for example, the intersection of horizons 110 with vertical grid lines. A grid 120 may be defined at horizon nodes 112, which are typically regularly spaced in the lateral direction and may be irregularly spaced in the vertical direction. In an alternate embodiment, nodes 112 may be regularly spaced in the vertical direction and irregularly spaced in the lateral direction. Other configurations of nodes 112 may be used.

Seismic data may be defined at the grid nodes 112, for example, including background medium properties, such as, the TTI (Tilted Transverse Isotropy) axial compression velocity, or alternatively, the isotropic velocity. Each point of horizon 110 may be specified by the direction of local normal 122 with respect to a reference horizon. The normal 122 may be represented by a dip and an azimuth angle. At each grid node, the direction of the TTI medium symmetry axis may be specified. In addition, at each grid node 112, other parameters may be specified, for example, Thomsen parameters, delta and epsilon.

For a given subsurface model 100, an influence coefficient or template matrix, Q (names other than Q may be used), may represent the properties of the undisturbed or initial model 100, for example, having coefficients that define an initial set of parameter values or characteristics. The initial set of parameter values may be calculated by tracing the rays for different combinations of source points 130 and receiver points 132 in the initial model 100. Typically, the initial set of characteristics includes inherent properties of the model 100 and may describe the physical constraints of the model 100 in its most basic, generic, or standard form. These sets of coefficients may be computed as part of the model 100 building procedure. The template matrix, Q, may be stored as an initial model 100 representation and may later be used for fast and accurate simulation/prediction of different perturbations of the initial model 100 parameter values. The initial model 100 representation of a set of seismic data may be used as a building block for generating each new model variation of the same set of seismic data.

2. Adapting the Model

Figure 2:
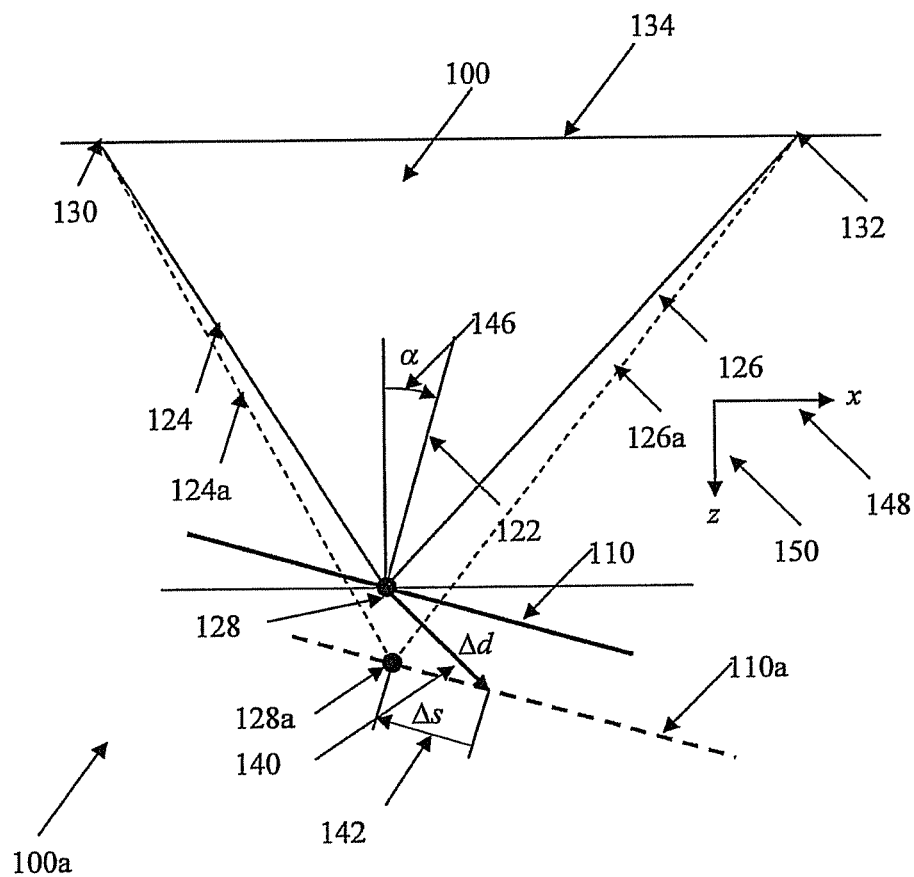
FIG. 2 is a schematic illustration of initial seismic data model altered to form a new seismic data model in accordance with an embodiment of the present invention.

Reference is made to FIG. 2, which is a schematic illustration of an initial seismic data model 100 altered to form a new seismic data model 100a in accordance with an embodiment of the present invention. In one embodiment, the alteration or perturbation may, for example, include a shift of the reflection horizon 110. In FIG. 2, the reflection point 128 may be moved by a reflection point shift 142 (e.g., vector Δd to a new position, reflection point 128a). Since the surface of horizon 110 may be considered locally flat, the reflection point shift 142 may be decomposed into a normal shift (e.g., the shift in the direction of a normal 122 to the horizon 110 surface), and a tangential shift. Typically only the normal shift affects the traveltime of corresponding ray pairs.

For a given change or perturbation to the initial subsurface model 100, a corresponding perturbation vector, X (other names for the perturbation vector may be used), may be generated representing the change. The perturbation vector, X, may be applied to the template matrix, Q, (e.g., by right multiplication) for generating a new traveltime that correspond to the updated model 100a. The coefficients of the perturbation vector, X, may include model parameter variations.

In one embodiment, the initial model 100 parameter values of the template matrix, Q, may be defined on a fine grid (e.g., grid 120 of FIG. 1) while the model parameter variations of the perturbation vector, X, may be defined on a coarse grid. For example, the resolution of a fine grid may be 4 milliseconds, and the resolution of a coarse grid may be 50 milliseconds. Since the coarse grid is less detailed than the fine grid, the changes in the model parameter values defined for individual coarse grid cells are typically piecewise-constant within the cells of the coarse grid while the values within the cells of the fine grid are typically continuously varying. Other grid refinements or configurations may be used. For example, "coarse" and "fine" may be terms relative to each other.

The tomographic coefficients of template matrix, Q, for model 100 may be computed by ray tracing along specular ray pairs (e.g., incident and reflected rays 124 and 126). The ray tracing may be performed choosing the different fine grid horizon nodes as sources and receivers, for a set of opening angles and for substantially all azimuths. The tomographic coefficients may be arranged in the template matrix, Q, where the number of rows (e.g., linear equations) in the matrix is typically equal to the number of traced rays. This number may be so large for a relatively large scale 3D model, that the resulting template matrix, Q, typically cannot be efficiently stored on some disks or in some computer memories. Embodiments of the invention may include converting the matrix, Q, into a set of relatively small compacted matrices, $Q_{ij}$. The dimension of each compacted matrix, $Q_{ij}$, may be, for example, equal to the number of nodes in a coarse grid 120.

Embodiments of the invention provide a system and method for fast and accurate simulation/prediction of changes in the position of structure horizons 110 or in the medium properties of subsurface geological model 100.

In some embodiments, time may be preserved. In time-preserving tomographic systems, the subsurface model 100 may be derived from seismic imaging, in which traveltimes along specular incident and reflected rays 124 and 126 travelling through the model 100 are assumed to be correct (e.g., fully agree with the recorded seismic data). Furthermore, these traveltimes may be preserved for any perturbed model 100a. For example, the traveltime along rays 124 and 126 may be approximately equal to the traveltime along rays 124a and 126a.

The individual alteration of each parameter value typically causes a change in the traveltime along specular rays of model 100. However, in time-preserving tomographic systems, the alterations of parameter values may be complementary so that when combined, the resulting traveltime changes cancel and there is no net or overall change in the traveltimes along specular rays.

For example, all points in the model need not be changed. It may be appreciated by those skilled in the art that altering model 100 may include altering only a portion of the model 100 corresponding to a subset of the seismic data set (e.g., or nodes 112 of grid 120). In some embodiments, the portion of the model may affect the traveltime for only a subset of ray pairs. Therefore, the model may be altered by altering a subset of only some of parameter values of the initial model. In one embodiment, the altered parameter values may inherently only affect a subset of ray pairs.

Time-preserving tomography may be used for geophysical interpretation and production tasks, such as uncertainty analysis, predicting horizon model changes due to different representations of medium properties (e.g., from isotropy to anisotropy, or from a certain degree of anisotropy to another degree of anisotropy). In addition, time-preserving tomography may be used for defining anisotropy parameter values due to mis-ties or discrepancies between model horizon locations and horizon markers measured in wells. The discrepancies may also be used for fast and accurate interactive model 100 correction, as described in further detail herein, for example, during the seismic collection or drilling process, resulting in optimal geosteering solutions.

3. Objectives

Embodiments of the invention may include a fast and accurate tomographic analysis and the prediction of displacements of the model horizons 110, for example, given perturbations of medium properties. Embodiments of the invention may include a fast and accurate simulation of variations of anisotropic medium parameter values, for example, given horizon shifts and perturbations of other mediums.

Embodiments of the invention provide a tomographic tool, for example, based on linear relationships between small variations of an anisotropic model parameter and the perturbations of other model parameter values. Each change in a parameter typically causes a residual or change in the traveltime for a two-way (e.g., incident ray 124 and reflected ray 126) path. However, since the model 100 satisfies the imaging conditions, it may be assumed that the total traveltime is preserved (e.g., remains unchanged).

The subsurface geological model 100 may include of a set of layers (e.g., formations 114) separated by interfaces (e.g., geological horizons 110). The formation interfaces, horizons 110, may be reflection and/or refraction horizons. The distribution of anisotropic medium parameter values is typically assumed to be continuous and smooth within each formation 114, and discontinuous at the transition zones along the interfaces (e.g., the horizons 110). In one embodiment, the medium of the model 100 may be a tilted transversely isotropic (TTI) medium, for example, having a given orientation of the symmetry axis and a given orientation of the horizon normal 122 at each point or at each geological layer formation 114. Other types or mediums, such as, more generally, a transversely isotropic (TI) medium, may be used.

In one embodiment, model 100 may be defined by (e.g., two) independent directions in a 3D space. One independent direction may be the orientation of the medium (e.g., TTI) axis of symmetry, which may be described by for example, a zenith and an azimuth angle. Another independent direction may be a normal 122 to the horizon surface, which may be defined at any point of each horizon 110 (e.g., though not necessarily at any point of the 3D space). The orientation of the normal 122 to the horizon surface may also be described by, for example, a zenith and an azimuth angle. Thus, at each node 112 intersecting a horizon, 110 the orientation of the normal 122 may be generally different from the orientation of the medium symmetry axis. At a point of the 3D space not corresponding to a node 112, typically only the orientation of the symmetry axis exists.

Variable model 100 parameters may include, for example, locations of interfaces or horizons 110 and properties of the TTI medium, such as, the axial compression velocity, $V_A$, two Thomsen anisotropy parameters, epsilon and delta (e.g., four parameters in total). The perturbed model parameters may be defined at horizon nodes 112, for example, with a coarse regular lateral grid. There may be a 3D spatial interpolation between the fine grid nodes and the coarse grid nodes of the model grid 120. Using the interpolation function, variations of any parameter may be simulated at any model nodes 112, given a change in the other three parameters. This technique is explained in further detail herein.

4. Main Assumptions

In some embodiment, time-preserving tomography may be used for altering a standard subsurface model 100. Time-preserving tomography may be based on the following assumptions:

Traveltimes along specular incident and reflected rays 124 and 126 are typically preserved.

Perturbations of model parameters are typically small, for example, having linear relationships between perturbations of different parameters.

Prediction/simulation is typically performed for one set of parameters at a time (e.g., assuming other parameters are given).

The trajectory of the incident and reflected rays 124 and 126 is typically stationary. Thus, small perturbations of the medium properties may cause traveltime variations, which may be due to the change in the ray velocity along the ray path, but are typically not due to the geometric change of ray trajectory.

Other embodiments may use different or additional assumptions. Although embodiments described herein use time-preserving tomography, it may be appreciated by those skilled in the art that this is not a requirement. Other embodiments of the invention may use tomographic methods in which one or more of these assumptions are not true. For example, when model parameters are perturbed or altered, traveltimes along specular incident and reflected rays 124 and 126 are also altered.

5. Ray Tracing in a Transversely Isotropic Medium Ray tracing in a TI medium (e.g., a 3D TTI medium) may be performed from a set of nodes 112 along the reflecting surfaces (e.g., horizons 110). From each reflection point 128 a set of specular ray pairs (e.g., incident and reflected rays 124 and 126) may be traced, for example, with different opening angles for substantially all azimuths. Along the trajectories of the incident and the reflected rays 124 and 126, traveltime, arc length and tomographic coefficients, may be calculated. Mathematically, ray tracing is typically a numerical solution to a set of ordinary differential equations (ODEs) having initial conditions (e.g., a position of a start point, the reflection point 128 and a direction of a phase velocity).

To simplify the ray tracing procedure, at each step of the numerical procedure the frame of reference may be rotated so that the axis of symmetry of the medium becomes vertical. Thus, the ray tracing problem may be simplified to tracing a TI medium having a vertical symmetry axis (VTI). For example, increments of the ray path $\Delta x, \Delta y, \Delta z$ and slowness components $p_x, p_y, p_z$ may be computed in the VTI frame, and then returned to a global frame. A rotation may be performed to achieve each new VTI frame (e.g., when the axis orientation differs from the axis orientation of the previous reflection point 128). The ray tracing algorithm may use the derivatives of the medium properties, and these derivatives are typically computed in the VTI frame. Along the ray trace, the ray Hamiltonian, G, typically vanishes. The VTI Hamiltonian, G, may be defined, for example, by the following:

$$G(p_h, p_z, x, y, z) = \frac{K - LV_P^2 - V_P^{-2}}{2(1-f)} \quad (5.1)$$

where functions K and L may be defined, for example, by:

$$K = (1+f) \cdot (p_h^2 + p_z^2) + 2\epsilon p_h^2 \quad (5.2)$$

$$L = f \cdot (p_h^2 + p_z^2)^2 + 2\epsilon p_h^2 \cdot (fp_h^2 + p_z^2) - 2\delta(1-f)p_h^2 p_z^2 \quad (5.2)$$

As with other formulas described herein, other formulas may be used. In the international system of units (SI), the units of the Hamiltonian, G, may be $[G] = s^2/m^2$. Parameters $p_z$ and $p_h$ may be vertical (e.g., axial) and horizontal (e.g., normal-to-axial) components of the ray slowness, respectively, such that, for example:

$$p_h^2 = p_x^2 + p_y^2 \quad (5.3)$$

Parameter $V_P$ may be the axial compression velocity, while $\delta$ and $\epsilon$ may be the first and the second Thomsen anisotropy parameters, delta and epsilon, respectively. Finally, parameter f may be the ratio of the axial shear velocity $V_S$ squared to the axial compression velocity $V_P$ squared. For the compression waves (e.g., or quasi-compression waves), for example, the following parameter constant may be assumed:

$$f = V_S^2/V_P^2 \approx \frac{1}{4} \quad (5.4)$$

The TI medium may be described by (e.g., five) parameters. However, at least one of the parameters, Thomsen gamma, is typically decoupled from the others. Thomsen gamma may, for example, describe pure shear motion in the horizontal plane. Parameter f is typically assumed to be a constant and known. Thus, the unknown parameters, for example, are typically axial compression velocity, Thomsen delta, and epsilon.

6. Update Slowness Magnitude

Since the Hamiltonian, G, typically vanishes along the rays (e.g., incident and reflected rays 124 and 126), the slowness magnitude p may be updated at each point of the trace, for example, given the slowness direction. Assuming that $\theta_{phs}$ is the dip (e.g., or zenith) angle of the slowness vector (e.g., typically, the azimuth does not matter for VTI), the slowness components are for example:

$$p_h = p \cdot \sin \alpha, \, p_z = p \cdot \cos \alpha \quad (6.1)$$

Solving the equation for the Hamiltonian, G, the normalized phase velocity, may be, for example:

$$\frac{V_{phs}^2}{V_P^2} = \frac{1+f}{2} + \quad (6.2)$$

$$\epsilon \sin^2 \theta_{phs} \pm \frac{1}{2} \sqrt{(1 - f + 2\epsilon \sin^2 \theta_{phs})^2 - 2(\epsilon - \delta)(1-f) \sin^2 2\theta_{phs}}$$

where the right-most term is typically positive when quasi-compression waves are studied and typically negative when quasi-shear waves are studied, when the waves are polarized in the vertical plane. The reciprocal of the phase velocity is the slowness magnitude, and the direction of the phase velocity typically coincides with the slowness direction, for example, as follows:

$$p = V_{phs}^{-1} \rightarrow p_h = \frac{\sin \theta_{phs}}{V_{phs}}, \, p_z = \frac{\cos \theta_{phs}}{V_{phs}} \quad (6.3)$$

7. Ray Tracing Equation Set

Ray pair trajectories may be generally constructed with a set of ray tracing equations. The equation set typically includes (e.g., six) basic ODEs and may include one or more additional complementary ODEs. The basic ODE equations may describe derivatives of the ray point location, for example, as follows:

$$\frac{dx}{d\sigma} = \frac{\partial G}{\partial p_x}, \, \frac{dy}{d\sigma} = \frac{\partial G}{\partial p_y}, \, \frac{dz}{d\sigma} = \frac{\partial G}{\partial p_z} \quad (7.1)$$

Equation 7.1 contains three propagation components along the x, y and z axes, respectively. The z component may be referred to as the "Axial Propagation" and the x and y components may be referred to as the "Propagation normal to the Axis of Symmetry".

and the derivatives of the slowness components, for example, as follows:

$$\frac{dp_x}{d\sigma} = -\frac{\partial G}{\partial x}, \frac{dp_y}{d\sigma} = -\frac{\partial G}{\partial y}, \frac{dp_z}{d\sigma} = -\frac{\partial G}{\partial z} \quad (7.2)$$

where σ may be an independent parameter along the ray path, having SI units, for example, [σ]=m²/s (e.g., velocity squared×time). Thus, the SI units for dr/dσ, where r stands for x,y,z may be [dr/dσ]=s/m and the SI units for dp/dσ may be [dp/dσ]=s²/m³. The partial Cartesian derivatives of the Hamiltonian, G, are typically related to the change of the medium properties in the 3D model 100 volume, for example, according to the following relationships:

$$\frac{\partial G}{\partial x} = \frac{\partial G}{\partial V_P} \cdot \frac{\partial V_P}{\partial x} + \frac{\partial G}{\partial \delta} \cdot \frac{\partial \delta}{\partial x} + \frac{\partial G}{\partial \varepsilon} \cdot \frac{\partial \varepsilon}{\partial x} \quad (7.3)$$

$$\frac{\partial G}{\partial y} = \frac{\partial G}{\partial V_P} \cdot \frac{\partial V_P}{\partial y} + \frac{\partial G}{\partial \delta} \cdot \frac{\partial \delta}{\partial y} + \frac{\partial G}{\partial \varepsilon} \cdot \frac{\partial \varepsilon}{\partial y}$$

$$\frac{\partial G}{\partial z} = \frac{\partial G}{\partial V_P} \cdot \frac{\partial V_P}{\partial z} + \frac{\partial G}{\partial \delta} \cdot \frac{\partial \delta}{\partial z} + \frac{\partial G}{\partial \varepsilon} \cdot \frac{\partial \varepsilon}{\partial z}$$

The derivatives of the Hamiltonian, G, with respect to the medium properties may be, for example:

$$\frac{\partial G}{\partial V_P} = \frac{2}{(1-f) \cdot V_P^3} - \frac{2\varepsilon p_h^2}{(1-f) \cdot V_P} - \frac{1+f}{1-f} \cdot \frac{p_h^2 + p_z^2}{V_P} \quad (7.4)$$

$$\frac{\partial G}{\partial \varepsilon} = \frac{1 - (fp_h^2 + p_z^2) \cdot V_P^2}{1-f} \cdot p_h^2, \frac{\partial G}{\partial \delta} = p_h^2 p_z^2 \cdot V_P^2$$

The additional equations of the ODE set may include, for example, arc length and/or traveltime (e.g., described in further detail in the section titled "Arc Length and Traveltime") and/or tomographic coefficients (e.g., described in further detail in the section titled "Tomographic Coefficients").

8. Arc Length and Traveltime

The arc length increment along a ray, dL, may be defined, for example, by:

$$dL = \sqrt{dx^2 + dy^2 + dz^2}. \quad (8.1)$$

Thus, the arc length derivative, $$\frac{dL}{d\sigma},$$

may be defined, for example, by:

$$\frac{dL}{d\sigma} = \sqrt{\left(\frac{dx}{d\sigma}\right)^2 + \left(\frac{dy}{d\sigma}\right)^2 + \left(\frac{dz}{d\sigma}\right)^2} \quad (8.2)$$

Combining equation (8.2) and the ray tracing equation (7.1) gives, for example:

$$\frac{dL}{d\sigma} = \sqrt{\left(\frac{\partial G}{\partial p_x}\right)^2 + \left(\frac{\partial G}{\partial p_y}\right)^2 + \left(\frac{\partial G}{\partial p_z}\right)^2} = \sqrt{\left(\frac{\partial G}{\partial p_h}\right)^2 + \left(\frac{\partial G}{\partial p_z}\right)^2} \quad (8.3)$$

The traveltime derivative along the ray may be obtained with the chain rule:

$$\frac{dt}{d\sigma} = \frac{\partial t}{\partial x} \cdot \frac{dx}{d\sigma} + \frac{\partial t}{\partial y} \cdot \frac{dy}{d\sigma} + \frac{\partial t}{\partial z} \cdot \frac{dz}{d\sigma} \quad (8.4)$$

Combining equation (8.4) and equation (7.1) gives, for example:

$$\frac{dt}{d\sigma} = \frac{\partial G}{\partial p_x} \cdot p_x + \frac{\partial G}{\partial p_y} \cdot p_y + \frac{\partial G}{\partial p_z} \cdot p_z \quad (8.5)$$

The SI units of the arc length derivative, $$\frac{dL}{d\sigma},$$

are [dL/dσ]=s/m and SI units of dt/dσ are [dt/dσ]=s²/m². In some embodiments, the traveltime and arc length of the ray path may be integrated "on-the-fly" i.e., during solving the ray tracing equation set (e.g., basic ODEs).

9. Variation of Traveltime

Small variations of the TI medium properties (e.g., axial compression velocity, epsilon, delta values) relate to the resulting change in traveltime along a whole ray or two-way ray pair (e.g., incident and reflected rays 124 and 126). The variation of traveltime follows from traveltime equation (8.5), for example, as follows:

$$\frac{\Delta(dt)}{d\sigma} = \frac{\partial G}{\partial p_x} \cdot \Delta p_x + \frac{\partial G}{\partial p_y} \cdot \Delta p_y + \quad (9.1)$$

$$\frac{\partial G}{\partial p_z} \cdot \Delta p_z + \Delta\left(\frac{\partial G}{\partial p_x}\right) \cdot p_x + \Delta\left(\frac{\partial G}{\partial p_y}\right) \cdot p_y + \Delta\left(\frac{\partial G}{\partial p_z}\right) \cdot p_z$$

Note that when parameter σ is an independent parameter, any arbitrary dependent function F(σ), such as traveltime, arc length, etc., may give, for example:

$$\Delta\left(\frac{dF}{d\sigma}\right) = \frac{\Delta(dF)}{d\sigma} \quad (9.2)$$

Replacing the right-hand or "tail end" terms of equation (9.1) with the corresponding terms of equation (7.1), gives, for example:

$$\frac{\Delta(dt)}{d\sigma} = \frac{\partial G}{\partial p_x} \cdot \Delta p_x + \frac{\partial G}{\partial p_y} \cdot \Delta p_y + \quad (9.3)$$

-continued $$\frac{\partial G}{\partial p_z} \cdot \Delta p_z + \Delta\left(\frac{dx}{d\sigma}\right) \cdot p_x + \Delta\left(\frac{dy}{d\sigma}\right) \cdot p_y + \Delta\left(\frac{dz}{d\sigma}\right) \cdot p_z$$

When parameter σ is independent of the ray path location, x, y, and z, then according to equation (9.2), for example:

$$\frac{\Delta(dt)}{d\sigma} = \frac{\partial G}{\partial p_x} \cdot \Delta p_x + \frac{\partial G}{\partial p_y} \cdot \Delta p_y + \frac{\partial G}{\partial p_z} \cdot \Delta p_z + \frac{\Delta(dx) \cdot p_x + \Delta(dy) \cdot p_y + \Delta(dz) \cdot p_z}{d\sigma} \quad (9.4)$$

When the ray trajectory is stationary, small perturbations of the medium properties typically do not cause such ray path changes that may affect the traveltime, and therefore, the ray path changes may be neglected, giving for example:

$$\Delta(dx) = \Delta(dy) = \Delta(dz) = 0 \quad (9.5)$$

Combining equation (9.4) and equation (9.5) gives, for example:

$$\frac{\Delta(dt)}{d\sigma} = \frac{\partial G}{\partial p_x} \cdot \Delta p_x + \frac{\partial G}{\partial p_y} \cdot \Delta p_y + \frac{\partial G}{\partial p_z} \cdot \Delta p_z \quad (9.6)$$

As described herein, the Hamiltonian typically vanishes along the ray path. When the Hamiltonian is constant, its full variation, ΔG, vanishes, for example, as follows:

$$G = \text{const } \Delta G = 0 \quad (9.7)$$

The ray Hamiltonian, G, typically depends on the slowness components and on the medium parameters, such that, for example:

$$\Delta G = \frac{\partial G}{\partial p_x} \cdot \Delta p_x + \frac{\partial G}{\partial p_y} \cdot \Delta p_y + \frac{\partial G}{\partial p_z} \cdot \Delta p_z + \frac{\partial G}{\partial V} \cdot \Delta V + \frac{\partial G}{\partial \delta} \cdot \Delta \delta + \frac{\partial G}{\partial \varepsilon} \cdot \Delta \varepsilon = 0 \quad (9.8)$$

The first three "left-most" terms of the Hamiltonian variation sum, ΔG, may relate to variations of traveltime. Combining equation (9.8) and equation (9.6) gives, for example:

$$\frac{\Delta(dt_{medium})}{d\sigma} = \frac{d(\Delta t_{medium})}{d\sigma} = -\frac{\partial G}{\partial V_P} \cdot \Delta V_P - \frac{\partial G}{\partial \delta} \cdot \Delta \delta - \frac{\partial G}{\partial \varepsilon} \cdot \Delta \varepsilon \quad (9.9)$$

The subscript "medium" in equation (9.9) may indicate that the derivative of the traveltime variation in this equation is typically due to small changes in the medium properties and typically does not take into account the horizon shifts.

10. Tomographic Coefficients

Tomographic coefficients may relate small perturbations of medium properties and displacements of horizons to traveltime errors along specular rays (e.g., incident and reflected rays 124 and 126). To obtain the residual traveltime caused by variations of the medium properties, equation (9.9) may be integrated along the ray path, for example, as follows:

$$\Delta t_{medium} = -\Delta V_P \cdot \int_\sigma \frac{\partial G}{\partial V_P} d\sigma - \Delta \delta \cdot \int_\sigma \frac{\partial G}{\partial \delta} d\sigma - \Delta \varepsilon \cdot \int_\sigma \frac{\partial G}{\partial \varepsilon} d\sigma \quad (10.1)$$

Tomographic coefficients, $A_V$, $A_\delta$, $A_\varepsilon$, may be derivatives of traveltime with respect to the model parameter variations, for example:

$$A_V = \frac{\partial(\Delta t_{medium})}{\partial \Delta V_P}, A_\delta = \frac{\partial(\Delta t_{medium})}{\partial \Delta \delta}, A_\varepsilon = \frac{\partial(\Delta t_{medium})}{\partial \Delta \varepsilon} \quad (10.2)$$

so that for example:

$$A_V = -\int_\sigma \frac{\partial G}{\partial V_P} d\sigma, A_\delta = -\int_\sigma \frac{\partial G}{\partial \delta} d\sigma, A_\varepsilon = -\int_\sigma \frac{\partial G}{\partial \varepsilon} d\sigma \quad (10.3)$$

where the integration may be performed in an isotropic or anisotropic medium along the ray pair trajectory. Combining equation (10.3) and equation (10.1) gives, for example:

$$\Delta t_{medium} = A_V \cdot \Delta V_P + A_\delta \cdot \delta + A_\varepsilon \cdot \Delta \varepsilon \quad (10.4)$$

Equation (10.4) holds for a given specific trajectory of the ray pair. Note that equation (10.3) may be arranged in the form of an ODE set, for example:

$$\frac{dA_V}{d\sigma} = -\frac{\partial G}{\partial V_P}, \frac{dA_\delta}{d\sigma} = -\frac{\partial G}{\partial \delta}, \frac{dA_\varepsilon}{d\sigma} = -\frac{\partial G}{\partial \varepsilon} \quad (10.5)$$

Equation set (10.5) represents the (e.g., three) additional ODEs of the ray tracing equation set, defining the model 100. The additional ODEs may be integrated during the basic ray tracing equation set and/or the calculation of the traveltime and arc length. Thus, the tomographic coefficients may be calculated "on-the-fly", for example, during the ray tracing. For each alteration of the model parameter values, these coefficients may be used to predict the corresponding changes for other parameter values for preserving the total traveltime along ray pairs of the model 100. However, the tomographic coefficients themselves are typically not altered by alterations of the model parameter values. In the section titled "Horizontal Shifts", tomographic coefficients that account for horizon shift alterations are described in further detail.

11. Horizon Shifts

A change in each of the locations of horizon, reflection point, and refraction points of a ray typically affect the traveltime of the ray.

Reference is again made to FIG. 2, in which a horizon is shifted from a first position, horizon 110, to a second position, horizon 110a. Model 100 may include geological formations 114 separated by horizon interfaces 110 (e.g., as described in reference to FIG. 1). A two-way ray path is shown in FIG. 2, including an initial incident ray 124 and an initial reflected ray 126 having an initial reflection point 128. For example, due to the horizon shift or other perturbations, the initial reflection point 128 may be shifted to an altered reflection point 128a, resulting in a new altered two-way ray path having an altered incident ray 124a, an altered reflected ray 126a.

The change in traveltime caused by shifts of the reflection point 128 is discussed first, after which the change in traveltime caused by shifts of refraction points (e.g., source point 130 and receiver point 132) are discussed. A change in traveltime may be referred to herein as a "traveltime residual".

Mathematically, horizon shifts are first considered for a two-dimensional (2D) model, and the results obtained for 2D model are then extrapolated for a general 3D model.

The traveltime for the ray pair, $T_{old}$, may be defined for example, by:

$$T_{old}^2 = \frac{(x_S - x_I^{old})^2 + (z_S - z_I^{old})^2}{V_{in,Ray}^2} + \frac{(x_R - x_I^{old})^2 + (z_R - z_I^{old})^2}{V_{re,Ray}^2} \quad (11.1)$$

where $V_{in,Ray}$ and $V_{re,Ray}$ may be group velocities of the incident ray 124 and reflected ray 126, respectively, at the image or reflection point 128. Source point 130 and receiver point 132 may be refraction points of the incident ray 124 and reflected ray 126, respectively, located on a nearest upper (e.g., refraction) horizon 134. Typically the velocity of the reflection point 128 need only be considered in the proximity of the reflection point 128.

In one embodiment, for example, to simplify mathematical derivations, the velocity of the formation considered may be assumed to be homogeneous, but this is not a requirement. The results of this section are valid for any inhomogeneous velocity field. For example, in other embodiments, the velocity within the formation may be non-homogeneous or piecewise-homogeneous.

The shift of the reflection or image point from the initial reflection point 128 to the altered reflection point 128a may include two vector counterparts: vector $\vec{\Delta d}$ 140, which may be the shift of the horizon 110, and vector $\vec{\Delta s}$ 142, which may be the shift of the reflection point along the horizon 110a. The horizon 110a may be considered locally planar. The traveltime, $T_{new}$, for the shifted ray pair 124a and 126a, may be defined for example, by:

$$T_{new}^2 = \frac{(x_S - x_I^{new})^2 + (z_S - z_I^{new})^2}{V_{in,Ray}^2} + \frac{(x_R - x_I^{new})^2 + (z_R - z_I^{new})^2}{V_{re,Ray}^2} \quad (11.2)$$

where the location of the "new" altered reflection point 128a may be represented, for example, as:

$$x_I^{new} = x_I^{old} + \Delta d_x + \Delta s \cdot \cos \alpha, \ z_I^{new} = z_I^{old} + \Delta d_z - \Delta s \cdot \sin \alpha \quad (11.3)$$

$\Delta s$ may be the signed length of the shift vector $\vec{\Delta s}$ 142 of the new reflection point 128a along the horizon surface 110a. Note that the dip angle, $\alpha$, 146 in FIG. 2 is negative. The signed shift $\Delta s$ in FIG. 2 is also negative. For a vanishing dip 146, the positive shift direction typically coincides with the positive direction of an axis x 148. The refraction points (e.g., source point 130 and point 132) may be considered to be significantly far away from each of the initial and altered reflection points 128 and 128a. Thus, the directions of the old and new incident rays 124 and 124a may be considered to be approximately the same. Likewise, the directions of the two reflected rays 126 and 126a may also be considered to be approximately the same. The effect of non-homogeneity of the velocity on the change in traveltime may also be considered to be negligible (e.g., mathematically infinitesimal of higher order). The traveltime residual is typically caused primarily by the change in the ray path length. Combining equation (11.3) and equation (11.2), gives, for example:

$$T_{new}^2 = \frac{(x_S - x_I^{old} - \Delta d_x - \Delta s \cdot \cos \alpha)^2 +}{V_{in,Ray}^2} + \frac{(z_S - z_I^{old} - \Delta d_z + \Delta s \cdot \sin \alpha)^2}{V_{in,Ray}^2} + \frac{(x_R - x_I^{old} - \Delta d_x - \Delta s \cdot \cos \alpha)^2 + (z_R - z_I^{old} - \Delta d_z + \Delta s \cdot \sin \alpha)^2}{V_{re,Ray}^2} \quad (11.4)$$

The shift $\Delta s$ along the horizon is typically unknown and may be calculated using Snell's law while minimizing the new traveltime, $T_{new}$, for example as follows:

$$dT_{new}^2/d\Delta s = 0 \quad (11.5)$$

which leads to $$\frac{\cos \alpha \cdot (x_S - x_I^{old} - \Delta d_x - \Delta s \cdot \cos \alpha) - \sin \alpha \cdot (z_S - z_I^{old} - \Delta d_z + \Delta s \cdot \sin \alpha)}{V_{in,Ray}^2} + \frac{\cos \alpha \cdot (x_R - x_I^{old} - \Delta d_x - \Delta s \cdot \cos \alpha) - \sin \alpha \cdot (z_R - z_I^{old} - \Delta d_z + \Delta s \cdot \sin \alpha)}{V_{re,Ray}^2} = 0 \quad (11.6)$$

Snell's law also holds for the initial, "old", or background ray pair including incident ray 124 and reflected ray 126. In the proximity of the initial reflection point 128, the location of the point may be given, for example, by:

$$x_I^{old} = a + s \cdot \cos \alpha, \ z_I^{old} = b - s \cdot \sin \alpha \quad (11.7)$$

where s is a scalar parameter along the initial background horizon 110 (e.g., also described as the locally planar surface). By combining equation (11.1) and equation (11.7) the traveltime, $T_{old}$, for the initial ray pair may be defined for example, by:

$$T_{old}^2 = \frac{(x_S - a - s \cdot \cos \alpha)^2 + (z_S - b + s \cdot \sin \alpha)^2}{V_{in,Ray}^2} + \frac{(x_R - a - s \cdot \cos \alpha)^2 + (z_R - b + s \cdot \sin \alpha)^2}{V_{re,Ray}^2} \quad (11.8)$$

Minimizing the traveltime gives parameter s, such that for example:

$$dT_{old}^2/ds = 0 \quad (11.9)$$

which leads to, for example:

$$\frac{\cos \alpha \cdot (x_S - a - s \cdot \cos \alpha) - \sin \alpha \cdot (z_S - b + s \cdot \sin \alpha)}{V_{in,Ray}^2} + \frac{\cos \alpha \cdot (x_R - a - s \cdot \cos \alpha) - \sin \alpha \cdot (z_R - b + s \cdot \sin \alpha)}{V_{re,Ray}^2} = 0 \quad (11.10)$$

Combining equation (11.7) and equation (11.10), gives, for example:

$$\frac{\cos \alpha \cdot (x_S - x_I^{old}) - \sin \alpha \cdot (z_S - z_I^{old})}{V_{in,Ray}^2} + \quad (11.11)$$

-continued $$\frac{\cos\alpha \cdot (x_R - x_I^{old}) - \sin\alpha \cdot (z_R - z_I^{old})}{V_{re,Ray}^2} = 0$$

Subtracting equation (11.11) (e.g., Snell's law at the new reflection or image point 128a) from equation (11.6) (e.g., Snell's law at the old reflection or image point 128), gives, for example:

$$\frac{\cos\alpha \cdot (\Delta d_x + \Delta s \cdot \cos\alpha) - \sin\alpha \cdot (\Delta d_z - \Delta s \cdot \sin\alpha)}{V_{in,Ray}^2} + \frac{\cos\alpha \cdot (\Delta d_x + \Delta s \cdot \cos\alpha) - \sin\alpha \cdot (\Delta d_z - \Delta s \cdot \sin\alpha)}{V_{re,Ray}^2} = 0 \quad (11.12)$$

Equation (11.12) may simplify to, for example:

$$(\Delta d_x \cdot \cos\alpha - \Delta d_z \sin\alpha + \Delta s) \cdot (V_{in,Ray}^{-2} + V_{re,Ray}^{-2}) = 0 \quad (11.13)$$

and the unknown parameter, s, may be defined, for example, by:

$$\Delta s = -\Delta d_x \cdot \cos\alpha + \Delta d_z \sin\alpha \quad (11.14)$$

The components of the inward normal 122 may be for example:

$$n_x = \sin\alpha, n_z = \cos\alpha \quad (11.15)$$

The components of the in-plane shift, Δs, 142 of the reflection point 128 may be for example:

$$\Delta s_x = \Delta s \cos\alpha, \Delta s_z = -\Delta s \sin\alpha \quad (11.16)$$

Combining equation (11.14) and equation (11.16), gives, for example:

$$\Delta s_x = -\Delta d_x \cdot \cos^2\alpha + \Delta d_z \sin\alpha \cos\alpha, \Delta s_y = +\Delta d_x \cdot \sin\alpha \cos\alpha - \Delta d_z \sin^2\alpha \quad (11.17)$$

The in-plane shift, Δs, 142 defined in equation (11.17), may be represented in vector form, for example, as:

$$\vec{\Delta s} = -\vec{n} \times \vec{\Delta d} \times \vec{n} \quad (11.18)$$

The total shift between the old location of the image or reflection point 128 and the new location of the reflection or image point 128a may be, for example:

$$\vec{\Delta l} = \vec{\Delta d} + \vec{\Delta s} = \vec{\Delta d} - \vec{n} \times \vec{\Delta d} \times \vec{n} \quad (11.19)$$

where the double cross product, $\vec{n} \times \vec{\Delta d} \times \vec{n}$, is given by, for example:

$$\vec{n} \times \vec{\Delta d} \times \vec{n} = \vec{n} \times (\vec{\Delta d} \times \vec{n}) = (\vec{n} \times \vec{\Delta d}) \times \vec{n} \quad (11.20)$$

If both rays of the pair, the incident ray 124 and the reflected ray 126, are assumed to arrive at the image or reflection point 128 (e.g., from the source and the receiver, respectively), then the residual traveltime caused by the reflection point shifts may be, for example:

$$\Delta t = (\vec{p}^{in} + \vec{p}^{re}) \cdot \vec{\Delta l} = \vec{\Delta d} + \vec{\Delta s} = (\vec{p}^{in} + \vec{p}^{re}) \cdot (\vec{\Delta d} - \vec{n} \times \vec{\Delta d} \times \vec{n}) \quad (11.21)$$

For a 3D model, a local frame of reference may be used, where each of the two vectors, for example, the normal n 122 to the reflection surface horizon 110 and the horizon shift Δd 140, are in the xz plane (e.g., formed by axis x 148 and an axis z 150). This means that equation (11.19), derived above for a 2D model, holds also for a general 3D model. Introducing the notation, $\vec{p}$, for the sum of slowness at the image or reflection point 128, for example:

$$\vec{p} = \vec{p}^{in} + \vec{p}^{re} \quad (11.22)$$

the equation (11.21) may be presented as, for example:

$$\Delta t = \vec{p} \cdot \vec{\Delta d} - \vec{p} \cdot \vec{n} \times \vec{\Delta d} \times \vec{n} = \vec{p} \cdot \vec{\Delta d} - \vec{p} \cdot [\vec{n} \times (\vec{\Delta d} \times \vec{n})] \quad (11.23)$$

The "right-most" term on the right side of equation (11.23) is a mixed product, and may be rearranged, for example, as:

$$\vec{p} \cdot [\vec{n} \times (\vec{\Delta d} \times \vec{n})] = (\vec{p} \times \vec{n}) \cdot (\vec{\Delta d} \times \vec{n}) \quad (11.24)$$

The reflection Snell's law, for example, for an arbitrary anisotropic medium, may be:

$$(\vec{p}^{in} + \vec{p}^{re}) \times \vec{n} = \vec{p} \times \vec{n} = 0 \quad (11.25)$$

It follows from Snell's law that a small shift of the image or reflection point 128 along the reflection horizon does not typically affect the total traveltime of a ray pair (e.g., including the incident and reflected rays 124 and 126). Thus, equation (11.18) may not be needed for traveltime calculations. Equation (11.23) may be simplified to, for example:

$$\Delta t = \vec{p} \cdot \vec{\Delta d} \quad (11.26)$$

Furthermore, the horizon shift vector $\vec{\Delta d}$ 140 may be decomposed into two components, for example, the normal 122 to the horizon 110 surface and a tangent to this surface. However, the tangent shift typically has no tomographic significance, and therefore may be considered negligible. Thus, the horizon shift 140 may be assumed to have only a normal 122 component, for example, as follows:

$$\vec{\Delta d} = \Delta d \vec{n} \quad (11.27)$$

where Δd is a scalar value. Combining equation (11.26) and equation (11.27) may give, for example:

$$\alpha t / \alpha d = \vec{p} \cdot \vec{n} = (\vec{p}^{in} + \vec{p}^{re}) \cdot \vec{n} \quad (11.28)$$

The tomographic coefficient of the horizon shift 140 may be a scalar product of normal 122 direction and the sum of ray pair slowness. For the inward normal 122, both rays (e.g., incident and reflected rays 124 and 126) may travel from the source point 130 and receiver point 132, respectively, and arrive at the image or reflection point 128a. Alternatively, the two rays may be emerging from the reflection or image point, in which case the normal 122 may be "outwardly" directed (e.g., in a direction opposite to the direction shown in FIG. 2).

Consider a particular case where the reflection point shift is vertical. It may be noted that any shift of a planar (e.g., locally planar) horizon 110 may be represented as a vertical shift, for example, by:

$$\Delta d_x = 0, \Delta d_y = 0, \Delta d_z = \Delta z \quad (11.29)$$

Figure 3:
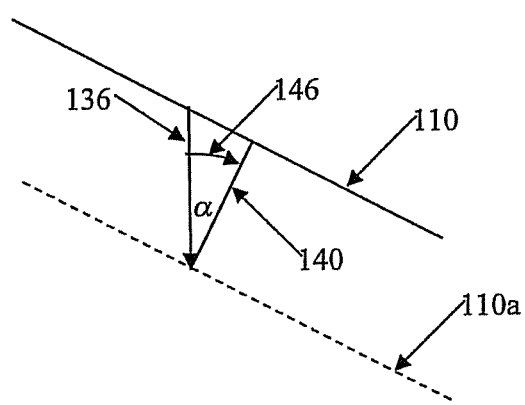
FIG. 3 is a schematic illustration of a horizon normal shift replaced by a horizon vertical shift in accordance with an embodiment of the present invention.

Reference is made to FIG. 3, which schematically illustrates a horizon normal shift, Δd, 140 is replaced by the horizon vertical shift, Δz, 136. A relationship between the normal shift 140 and the vertical shift 136 may be given, for example, by:

$$\Delta d = \Delta z \cos\alpha = \Delta z n_z \quad (11.30)$$

Combining equation (11.30) and equation (11.26), gives, for example:

$$\Delta t = \vec{p} \cdot \vec{\Delta d} = \vec{p} \cdot \vec{\Delta d}_n = p_n \cdot \Delta d_n = \vec{p} \cdot \vec{n} \Delta z n_z \quad (11.31)$$

Expanding the scalar product of equation (11.31) gives, for example:

$$\Delta t = (p_x n_x + p_y n_y + p_z n_z) \Delta z n_z = (p_x n_x n_z + p_y n_y n_z + p_z n_z^2) \Delta z \quad (11.32)$$

Snell's law, as shown in equation (11.25), may also be expanded, for example, as:

$$\vec{p} \times \vec{n} = 0 \rightarrow \begin{array}{l} p_y n_z = p_z n_y \\ p_z n_x = p_x n_z \\ p_x n_y = p_y n_x \end{array} \quad (11.33)$$

It follows from equation (11.33) that, for example:

$$p_x n_x n_z = p_z n_x^2, \; p_y n_y n_z = p_z n_y^2 \quad (11.34)$$

Combining equation (11.34) and equation (11.32) gives, for example:

$$\Delta t = (p_z n_x^2 + p_z n_y^2 + p_z n_z^2) \Delta z = p_z (n_x^2 + n_y^2 + n_z^2) \Delta z = p_z \Delta z \quad (11.35)$$

Thus, the tomographic coefficient for a vertical shift 136 of the reflection point 128 may be, for example:

$$\Delta t_{reflection}/\Delta z = p_z^{reflection} = p_z^{in} + p_z^{re} \quad (11.36)$$

For a refraction point (e.g., source point 130 and receiver point 132), the ray pair (e.g., the incident and reflected rays 124 and 126) typically arrives to the upper side of a horizon 110, and emerges from the lower side. As shown for the reflection point 128, the slowness of the arriving ray should be considered positive, therefore, for example:

$$\Delta t_{refraction}/\Delta z = p_z^{refraction} = p_z^{upper} - p_z^{lower} \quad (11.37)$$

The use of plus and/or minus signs used in equation (11.37) may for example be verified by the following example. Consider a vertical or almost vertical ray propagating "downward" (e.g., from source point 130 and receiver point 132 of the refraction horizon 134 to the reflection point 128). Consider the refraction horizon 134 with a "slow" medium above the interface and a "fast" medium below the interface. The terms "slow" or "fast" medium may, for example, refer to a speed at which a ray or wave propagates through the medium. A positive vertical shift in the refraction horizon 134 (e.g., a shift downward) may increase the slow zone through which the ray propagates, thus increasing the traveltime of the ray. In this case, when the traveltime, $t_{refraction}$, increases, the derivative thereof, $\Delta t_{refraction}/\Delta z$, on the left side of equation (11.37) may be positive. Referring now to the right side of equation (11.37), since, in this example, the upper medium is "slow" and the lower medium is "fast", for a vertical ray propagating downward, $p_z^{upper} > p_z^{lower}$. Thus, the right side of equation (11.37) may also be positive.

12. Governing Equations

The tomographic coefficients (e.g., $A^V, A^\delta, A^\epsilon, A^S$) may be derivatives of, for example, traveltimes of the rays 124 and 126 with respect to the medium properties, horizon shifts, and/or other altered properties or model perturbations. For example:

$$A_{h,i,j,k}^V = \frac{\partial t_{h,i,j}}{\partial \Delta V_k}, \; A_{h,i,j,k}^\delta = \frac{\partial t_{h,i,j}}{\partial \Delta \delta_k} \quad (12.1)$$

$$A_{h,i,j,k}^\epsilon = \frac{\partial t_{h,i,j}}{\partial \Delta \epsilon_k}, \; A_{h,i,j,k}^z = \frac{\partial t_{h,i,j}}{\partial \Delta z_k}$$

The indices, h, i, j, k, in equation (12.1) may be defined, for example, as follows (other definitions may be used):
- h may be an index of horizon 110;
- i may be an index of the reflection point 128 (e.g., a starting point of the ray pair 124 and 126 on the fine lateral grid 120), which may define the in-line and cross-line locations;
- j may be an index of the opening angle, which may define the magnitude and azimuth of the opening angle; and
- k may be the index of the model node on a coarse grid (e.g., along which model perturbations may be defined) related to the given coefficient, and may define the location of the coarse in-line, coarse cross-line, and horizon.

The first three indices, h, i, j, may fully define a ray pair including incident ray 124 and reflected ray 126. To simplify terms, a global index l may be introduced, such that, l={h,i,j}, where l likewise fully defines the ray pair. The four matrices defined in equation (12.1) may be, for example, rewritten as follows:

$$A_{l,k}^V = \frac{\partial t_l}{\partial \Delta V_k}, \; A_{l,k}^\delta = \frac{\partial t_l}{\partial \Delta \delta_k}, \; A_{l,k}^\epsilon = \frac{\partial t_l}{\partial \Delta \epsilon_k}, \; A_{l,k}^z = \frac{\partial t_l}{\partial \Delta z_k} \quad (12.2)$$

Each element of a matrix is related to a ray pair (e.g., indexed by l) and a model node k, where 1≤l≤n, 1≤k≤m, n is the total number of all ray pairs, and m is the number of model output nodes. Due to the typically large number of ray pair azimuths and reflection points 128, n may be significantly larger than m (e.g., n>>m). A change of each medium property, (e.g., a shift of horizons or another model perturbation) typically results in a change in the traveltime for a ray pair. However, by correspondingly changing properties (e.g., horizon shifts) at each node of the model 100, in a complementary way (e.g., to provide an equal and opposite change in traveltime) the total traveltime of each ray pair typically remains the same, for example as follows:

$$\sum_k A_{m,k}^V \cdot \Delta V_k + \sum_k A_{m,k}^\delta \cdot \Delta \delta_k + \sum_k A_{m,k}^\epsilon \cdot \Delta \epsilon_k + \sum_k A_{m,k}^z \cdot \Delta z_k = 0 \quad (12.3)$$

This equation describes the preservation of traveltime along a specific ray pair path (e.g., for a specific index m). As shown in equation (12.3), for a set of altered parameter values, $\Delta V$, $\Delta \delta$, $\Delta \epsilon$, $\Delta z$, the corresponding changes in traveltime are $$\sum_k A_{m,k}^V \cdot \Delta V_k, \; \sum_k A_{m,k}^\delta \cdot \Delta \delta_k, \; \sum_k A_{m,k}^\epsilon \cdot \Delta \epsilon_k, \; \sum_k A_{m,k}^z \cdot \Delta z_k,$$

respectively. The total change in traveltime is equal to the sum of these contributions, and for the time-preserving tomography, the resulting residual traveltime vanishes. For each ray pair, equation (12.3) may be written in the matrix form, for example:

$$A_V \cdot \Delta V + A_\delta \cdot \Delta \delta + A_\epsilon \cdot \Delta \epsilon + \Delta z = 0 \quad (12.4)$$

Matrices A may have dimension, for example, n×m. Since n is typically larger than m (e.g., n>>m), each matrix A may be rectangular having a height (e.g., n rows) that is typically much larger than the length of the matrix (e.g., m columns).

Using equation (12.4) each one of the unknown parameters, for example, $\Delta V, \Delta \delta, \Delta \epsilon, \Delta z$, may be estimated given the three other parameter values. The unknown parameter values may be estimated, for example, by multiplying equation (12.4) by a corresponding transposed matrix, for example, as follows:

$$A_V^T A_V \cdot \Delta V = -A_V^T A_\delta \cdot \Delta \delta - A_V^T A_\epsilon \cdot \Delta \epsilon - A_V^T A_z \cdot \Delta z \text{ to predict } \Delta V$$

$$A_\delta^T A_\delta \cdot \Delta \delta = -A_\delta^T A_V \cdot \Delta V - A_\delta^T A_\epsilon \cdot \Delta \epsilon - A_\delta^T A_z \cdot \Delta z \text{ to predict } \Delta \delta$$

$$A_\epsilon^T A_\epsilon \cdot \Delta\epsilon = -A_\epsilon^T A_V \cdot \Delta V - A_\epsilon^T A_\delta \cdot \Delta\delta - A_\epsilon^T A_z \cdot \Delta z \text{ to predict } \Delta\epsilon$$

$$A_z^T A_z \cdot \Delta z = -A_z^T A_V \cdot \Delta V - A_z^T A_\delta \cdot \Delta\delta - A_z^T A_\epsilon \cdot \Delta\epsilon \text{ to predict } \Delta z \quad (12.5)$$

For example, the following notations for the matrix products of equation (12.5) may be introduced:

$$Q_{VV}=A_V^T \cdot A_V, \ Q_{V\delta}=A_V^T \cdot A_\delta, \ Q_{V\epsilon}=A_V^T \cdot A_\epsilon, \ Q_{Vz}=A_V^T \cdot A_z \text{ to predict } \Delta V$$

$$Q_{\delta\delta}=A_\delta^T \cdot A_\delta, \ Q_{\delta V}=A_\delta^T \cdot A_V, \ Q_{\delta\epsilon}=A_\delta^T \cdot A_\epsilon, \ Q_{\delta z}=A_\delta^T \cdot A_z \text{ to predict } \Delta\delta$$

$$Q_{\epsilon\epsilon}=A_\epsilon^T \cdot A_\epsilon, \ Q_{\epsilon V}=A_\epsilon^T \cdot A_V, \ Q_{\epsilon\delta}=A_\epsilon^T \cdot A_\delta, \ Q_{\epsilon z}=A_\epsilon^T \cdot A_z \text{ to predict } \Delta\epsilon$$

$$Q_{zz}=A_z^T \cdot A_z, \ Q_{zV}=A_z^T \cdot A_V, \ Q_{z\delta}=A_z^T \cdot A_\delta, \ Q_{z\epsilon}=A_z^T \cdot A_\epsilon \text{ to predict } \Delta z \quad (12.6)$$

Matrices Q of equation (12.6) are typically small square matrices (e.g., with two dimensions equal and small). In addition, the matrices Q are typically non-negative definite. Using a small standard correction, the matrices may be converted to positive definite. Each of the four matrices $Q_{VV}, Q_{\delta\delta}, Q_{\epsilon\epsilon}, Q_{zz}$ that have the same left and right indices is typically symmetric (e.g., each matrix is equal to the transpose of the matrix). In addition, there is typically a symmetry between pairs of the other twelve matrices Q. For example, each matrix (e.g., $Q_{V\delta}$) having a left index equal to the right index of another matrix and a right index equal to the left index of the other matrix (e.g., $Q_{\delta V}$), may be symmetric with respect to the other matrix, for example, as follows:

$$Q_{V\delta}=A_V^T \cdot A_\delta = (A_\delta^T \cdot A_V)^T = Q_{\delta V}^T \quad (12.7)$$

The twelve matrices of equation (12.6) may have such a symmetry, for example, as follows:

$$Q_{V\delta}=Q_{\delta V}^T, \ Q_{V\epsilon}=Q_{\epsilon V}^T, \ Q_{Vz}=Q_{zV}^T$$

$$Q_{\delta\epsilon}=Q_{\epsilon\delta}^T, \ Q_{\delta z}=Q_{z\delta}^T, \ Q_{\epsilon z}=Q_{z\epsilon}^T \quad (12.8)$$

Thus, only ten of matrices Q need to be stored: four with repeating subscripts and six with different subscripts. For example, the other six may be derived from their respective symmetric pair using the relationship defined, for example, in equation (12.8).

Combining equation (12.6) and equation (12.5), gives, for example:

$$Q_{VV} \cdot \Delta V = B_V, \ B_V = -Q_{V\delta} \cdot \Delta\delta - Q_{V\epsilon} \cdot \Delta\epsilon - Q_{Vz} \cdot \Delta z \text{ to predict } \Delta V$$

$$Q_{\delta\delta} \cdot \Delta\delta = B_\delta, \ B_\delta = -Q_{\delta V} \cdot \Delta V - Q_{\delta\epsilon} \cdot \Delta\epsilon - Q_{\delta z} \cdot \Delta z \text{ to predict } \Delta\delta$$

$$Q_{\epsilon\epsilon} \cdot \Delta\epsilon = B_\epsilon, \ B_\epsilon = -Q_{\epsilon V} \cdot \Delta V - Q_{\epsilon V} \cdot \Delta V - Q_{\epsilon\delta} \cdot \Delta\delta - Q_{\epsilon z} \cdot \Delta z \text{ to predict } \Delta\epsilon$$

$$Q_{zz} \cdot \Delta z = B_z, \ B_z = -Q_{zV} \cdot \Delta V - Q_{z\delta} \cdot \Delta\delta - Q_{z\epsilon} \cdot \Delta\epsilon \text{ to predict } \Delta z \quad (12.9)$$

Matrices Q are template matrices typically fully defined by the properties of the background or standard model 100. Template matrices, Q, are typically independent of input and output variations (e.g., perturbations) of model parameter values and remain unchanged by altering model parameter values. When the matrices Q define a large number of rays n, adding extra rays typically only slightly changes these matrices.

13. Cholesky Decomposition

The standard subsurface model 100, defined by template matrices Q, may be adapted for alteration by (e.g., right) multiplication by a perturbation vector, X. When multiplying the template matrices Q by the perturbation matrix, X, a new perturbed model, defined by the altered parameter values, is typically generated.

To simulate different models, the same (e.g., left side) template matrices, for example, $Q_{VV}, Q_{\delta\delta}, Q_{\epsilon\epsilon}, Q_{zz}$, (e.g., collectively defining the same standard model 100) may be (e.g., right) multiplied by different right side vectors. For example, multiplying the template matrices by each of (e.g., three) different perturbation vectors, $X_1, X_2, X_3$ may generate (e.g., three) different new models. Typically only the (e.g., right side) perturbation vectors should be altered for generating the model variations. Thus, a single set of template matrices may be used and stored as the building blocks for generating other models of the same data for fast and effective model-building algorithm.

The template matrix, Q, may be split into a product of lower triangular $S^T$ and upper triangular matrices, S. The lower triangular matrix $S^T$ is a transpose of the upper triangular matrix, S, and therefore only one of the upper and lower triangular matrices is typically stored. The template matrix Q may be a symmetric positive definite matrix represented, for example, as:

$$Q = S^T \cdot S \quad (13.1)$$

The right multiplication of the template matrix Q by a perturbation vector X may be defined by a matrix equation, for example:

$$Q \cdot X = B \quad (13.2)$$

Combining equation (13.1) and equation (13.2), gives, for example:

$$S^T S \cdot X = B \quad (13.3)$$

By introduce the following notation, for example:

$$S \cdot X \equiv Y \quad (13.4)$$

The term $S \cdot X$ in equation (13.3) may be substituted by Y (e.g., according to equation (13.4)), giving for example:

$$S^T \cdot Y = B \quad (13.5)$$

After the matrix equation (13.1) is split into equations (13.4) and (13.5), a backward substitution may be performed twice, once using the upper triangular matrix, S and once using the lower triangular matrix $S^T$, for example, as follows:

$$S^T \cdot Y = B \text{ Solve for } Y \text{ BackwardSubstitution 1}$$

$$S \cdot X = Y \text{ Solve for } X \text{ BackwardSubstitution 2} \quad (13.6)$$

Equation (13.1) may be solved relatively slowly (e.g., with a relatively large amount of computational effort), but is typically only solved once for each type of simulation (e.g., there may be up to four types of simulations in total; the number of simulations may be based on the number of parameters defined at a node). Equations (13.4) and (13.5) may be solved relatively quickly (e.g., with a relatively small amount of computational effort) and may be solved or run in succession. For example, if the dimension of the matrix, Q, is m and the band-width of the matrix, Q, is b, then solving equation (13.1) typically requires about $mb^2/3$ floating point operations, while solving each of equations (13.4) and (13.5) typically requires approximately mb floating point operations. Equation (13.6) may apply each of equations (13.4) and (13.5) using a right application sequence.

It may be appreciated by those skilled in the art that embodiments of the present invention may use data arrangements other than matrices and/or vectors and operations other that matrix/vector multiplication. In particular the right multiplications of matrix Q by vector X is merely an example of an operation and is not meant to be limiting. For example, systems of equations may be solved using the other methods.

Perturbation vector, X, may include the residual values of the altered model 100a parameter values, $\Delta V_k$, $\Delta \delta_k$, $\Delta \epsilon_k$, and $\Delta z_k$, for preserving traveltime along each ray pair. k may be the index of the coarse intervals of the model grid 120. Three of these four parameter values are typically known or specified. Equation (13.6) may be used to determine the unknown part of the perturbation vector, X. The known part of the perturbation vector, X, is used to calculate the right side of the equation set of equation (13.6).

14. From Isotropy to Anisotropy

Embodiments of the invention provide a model-building algorithm for building an anisotropic model 100a from a standard isotropic model 100. Changing the medium of the model 100 from an isotropic medium to an anisotropic medium typically changes the traveltimes along the model ray pairs. In order to maintain the overall traveltimes of the ray pairs, another parameter, for example, the location of horizon 110 of the isotropic model, may be shifted in a complementary way to provide an equal and opposite or cancelling change in traveltime.

An anisotropic model may be defined, for example, by medium parameters such as the axial compression velocity and two Thomsen anisotropy parameters, epsilon and delta. Initially an anisotropic model may be generated, for example, having an axial compression velocity approximately equal to a compression velocity of the isotropic model, and having identically zero Thomsen parameter values. For example:

$$V_P = V_{Iso}, \delta = 0, \epsilon = 0 \quad (14.1)$$

It may be noted that even for zero values of epsilon and delta, the derivatives of the Hamiltonian, $\propto G/\propto \delta$ and $\propto G/\propto \epsilon$, are typically not zero. Thus, the corresponding tomographic coefficients typically exist. Traveltimes along ray pairs are typically preserved up to 30° opening angles. In other embodiments, traveltimes may be preserved up to other (e.g., larger) opening angles.

An anisotropic tomography ray tracing simulation may be run with the given medium parameter values, for example, for opening angles (e.g., up to 30°), for substantially all azimuths. In other embodiments, for example, when traveltimes are preserved for other (e.g., larger) opening angles, the ray tracing simulation may be run up to the other (e.g., larger) opening angle. In yet another embodiment, simulations may be run beyond the opening angle for which time is preserved.

For each ray pair (e.g., incident and reflected rays 124 and 126), tomographic coefficients may be calculated for the medium parameter values and for vertical shifts 136 of source point 130 and receiver point 132 and/or refraction points 128 along horizons. Next, a small square positive definite matrix $Q_{zz}$, and other (e.g., non-symmetric) small square matrices $Q_{zV}, Q_{z\delta}, Q_{z\epsilon}$ may be calculated. The dimensions of the square matrices may correspond to the number of model nodes 112. For example, an n×n matrix of dimension n*n may correspond to a model 100 having n nodes 112. There may be multiple (e.g., 4) parameter values at each node 112. Thus, there may be multiple (e.g., 4n) parameter values representing the model 100. However, some of the parameter values (e.g., 3n) may be known. Thus, the remaining (e.g., n) unknown parameter values (e.g., or parameter value updates) may be calculated. For example, a model 100 may have an n×n matrix of dimension n*n having n parameter values (e.g., the number of unknown parameter values of the model).

The matrix $Q_{zz}$ may be defined, for example, according to the last equation in the set of equations (12.9), which is:

$$Q_{zz} \cdot \Delta z = B_z, B_z = -Q_{zV} \cdot \Delta V - Q_{z\delta} \cdot \Delta \delta - Q_{z\epsilon} \cdot \Delta \epsilon \quad (14.2)$$

Matrices Q may be calculated using tomography methods. Matrix $Q_{zz}$ may be split into a product of lower and upper triangular matrices, for example, as:

$$Q_{zz} = S_z^T \cdot S_z \quad (14.3)$$

In one embodiment, matrices Q may be generated, and split once. The matrices Q may be saved or stored, for example, on disk or in memory for repeated access and use for generating each new model 100a.

For each new model 100a alteration of the standard model 100, different parameter values may be used causing different combinations of input changes or residuals, $\Delta V, \Delta d, \Delta \epsilon$. The vector $B_z$ may be calculated from equation (14.2).

Combined equation (14.2) and equation (14.3) gives, for example:

$$S_z^T S_z \cdot \Delta z = B_z \quad (14.4)$$

The vertical shifts $\Delta z$ 136 (e.g., corresponding to altering the model from an isotropic to an anisotropic model) may be found by running a backward substitution for equation (14.4), for example, twice: once using the upper triangular matrix, $S_z$, and once using the lower triangular matrix $S_z^T$.

15. Prediction of Thomsen Delta with Well Study

Embodiments of the invention provide an estimate of the first Thomsen parameter, delta, using isotropic analysis and well information. Isotropic analysis gives an estimation of the background depth of horizon nodes, $z_{Iso}$ (e.g., reflection points 128 and/or source point 130 and receiver point 132). Using well information, a true or experimentally measured depth $z_{Well}$ is obtained. Next, the residuals of the depths of the horizon nodes depths are assumed to be, for example:

$$\Delta z = z_{Well} - z_{Iso} \quad (15.1)$$

The background values for Thomsen parameter values may be assumed to be, for example, zero. The relationship between residual axial velocity and residual parameter delta follows from the second equation of set of equations (12.9), $$Q_{\delta\delta} \cdot \Delta \delta = B_\delta, B_\delta = -Q_{\delta V} \cdot \Delta V - Q_{\delta\epsilon} \cdot \Delta \epsilon - Q_{\delta z} \cdot \Delta z \quad (15.2)$$

The residual of the second Thomsen parameter epsilon may also be assumed to be, for example, zero, $\Delta \epsilon = 0$. Thus, the right side of the equation (15.2) simplify, for example, to:

$$B_\delta = -Q_{\delta V} \cdot \Delta V - Q_{\delta z} \cdot \Delta z \quad (15.3)$$

Equation (15.2) may be solved to obtain the residual delta $\Delta \delta$, for different perturbations of the model 100 (e.g., by multiplication by different right side perturbation vectors) in accordance with various simulations.

16. Applications

Time-preserving tomography may be an extremely attractive solution for several key geophysical interpretation and production tasks, such as, uncertainty analysis, predicting horizon model changes due to different representations of medium properties (e.g. from isotropy to anisotropy, or from a certain degree of anisotropy to another degree of anisotropy), and for defining anisotropy parameter values due to mis-ties between model horizon locations and for example horizon markers measured in the wells. Defining anisotropy parameter values may also be used for fast and accurate interactive model correction throughout the drilling process for providing optimal geosteering solutions. Embodiments of the invention may have other benefits and have other applications.

Embodiments of the invention may include a method that uses special symmetric structures of constructed tomographic matrices (e.g., influence or template matrices, Q). The coefficients of these matrices typically depend on the properties of the background model such as model 100 and are typically independent of model perturbations or residuals of model parameters. Such methods may enable the alteration of the standard model by solving multiple linear equation sets (e.g., arranged in template matrices, Q), defining the standard model, with different right side vectors (e.g., arranged in perturbation vector, X). Each of the multiple linear equation sets may be defined by template matrix, $Q_{ij}$ each of which is square small, symmetric, and positive definite. In some embodiments, the template matrix may undergo the Cholesky decomposition for example typically only once. Solving equation sets with triangular matrices (e.g., using the backward substitution described in reference to equation (13.6)) may then be run for each new or altered model.

Embodiments of the invention may enable task-oriented interpretative queries. For example, embodiments of the invention may be used to solve the questions: "What are typically the location changes of the horizon nodes due to given perturbations of the axial compression velocity and Thomsen parameter values?"; or, "What are typically the changes of the Thomsen parameter values, delta, due to given shifts of horizons and/or given changes of axial velocity (e.g., for a vanishing Thomsen parameter epsilon)?" A zero resulting residual traveltime along the full two-way path of the ray pair (e.g., incident and/or reflected) may be assumed.

Embodiments of the invention may enable the model to be altered or transformed, for example, from an isotropic to an anisotropic medium. An isotropic medium is considered to be anisotropic, for example, with the isotropic compression velocity coinciding with the axial compression velocity of the (e.g., tilted TI) medium and, for example, the Thomsen parameter values, delta and epsilon, vanishing. The currently vanishing Thomsen parameter values, delta and epsilon may be updated. Embodiments of the invention may enable different variations of medium parameter values or locations of model horizons and their effects on the other parameters to be determined. In particular, by measuring mis-ties between horizons picked along isotropic seismic models and horizon markers defined along wells, the Thomsen parameter, delta, may be determined.

Embodiments of the invention may provide uncertainty analysis for defining amplification factors. For example, given a small error (e.g., or uncertainty) in one or more parameter values of a given one or more model nodes, the uncertainties in the parameter of a specific one or more or all nodes of the model may be determined.

Embodiments of the invention may enable geosteering. Geosteering may include a process for adjusting the borehole position and direction for reaching geological targets. These changes may be based on geological information gathered while drilling and may be made during the data acquisition process or "on-the-fly". The information may include measurements of the medium properties along the well, such as, the transitions (e.g., horizon markers) between different geological formations. Using time-preserving tomographic analysis, such "on-the-fly" adjustments to the structure model, and corresponding adjustments of the well path may be more accurately made.

17. A System for Altering Seismic Data Models

Figure 4:
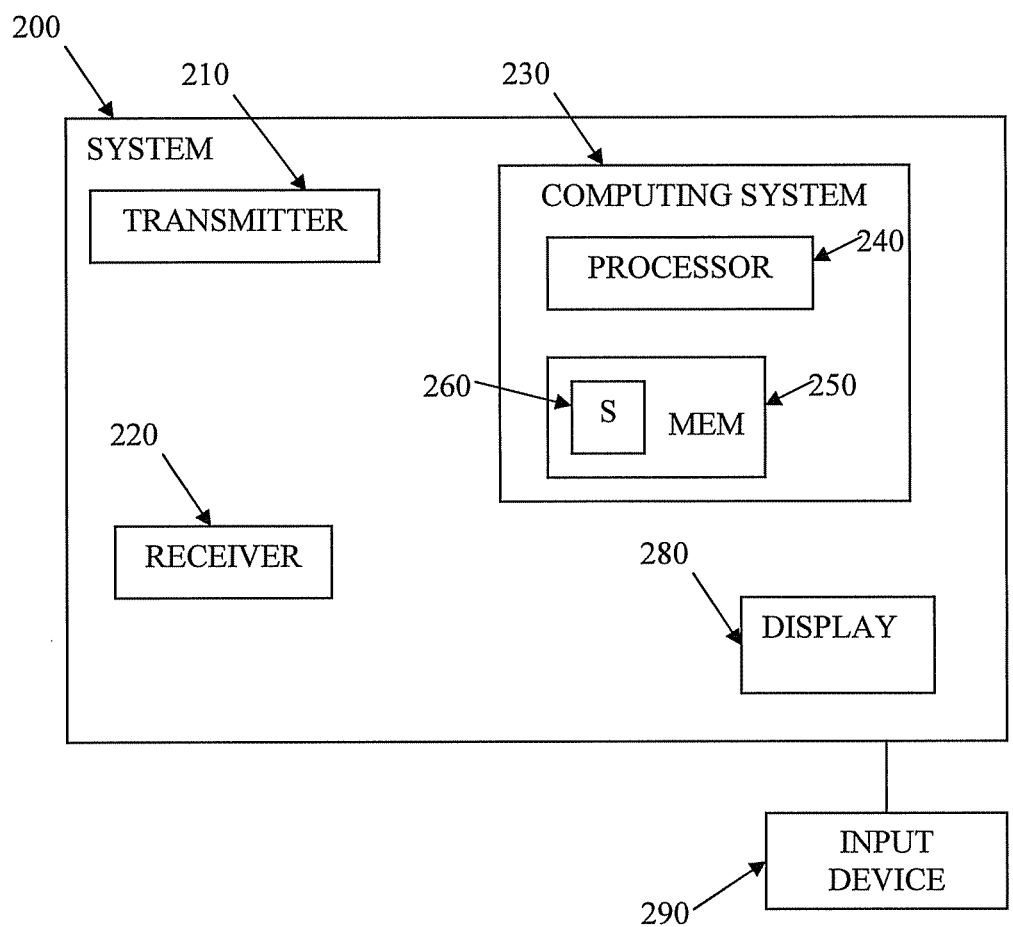
FIG. 4 is a schematic illustration of a system that may be used in accordance with an embodiment of the present invention.

Reference is made to FIG. 4, which schematically illustrates a system in accordance with an embodiment of the present invention. System 200 may be used, for example, to display, convert or alter seismic data models as described herein. System 200 may perform embodiments of any of the methods discussed herein, and/or other operations or computations.

System 200 may include a transmitter 210, a receiver 220, a computing system 230, a display 280, and an input device 290. Transmitter 210 (e.g., located at source point 130, described in reference to FIGS. 1 and 2) may output any suitable signals, or generate incident signal(s). For example, a series of sonic or seismic energy rays or waves may be emitted from each of multiple locations. Receiver 220 (e.g., located at receiver point 132, described in reference to FIGS. 1 and 2) may accept reflected signal(s) that correspond or relate to incident signals, sent by transmitter 210. In the case of imaging in other areas, e.g., medical imaging, transmitter 210 may output energy such as ultrasound, magnetic, x-ray, or other suitable energy.

Computing system 230 may include, for example, processor 240, memory 250 and software 260. Processor 240 may process data, for example, raw data received from receiver 220. Memory 250 may store data, for example, raw or processed seismic data, such as template matrices, Q, representing the generic standard model for a set of data from which other models of the data are generated. Memory 250 may store the results of operations executed according to embodiments of the invention. Operations executed according to embodiments of the invention, such as for example, generating template matrices, generating perturbation vectors, operations such as matrix/vector multiplication, solving any of the aforementioned numbered equations (5.1) to (15.3), solving systems of linear equations, quadratic equations, partial differential equations, ordinary differential equations, ray tracing, converting models, etc. may be operated or calculated, for example, by processor 240 executing software 260. Other units or processors may perform such operations, or other operations according to embodiments of the present invention.

Display 280 may display data from transmitter 210, receiver 220, computing system 230, or any other suitable systems, devices, or programs, for example, an imaging program or software, or a transmitter or receiver tracking device. Display 280 may display the results of operations executed according to embodiments of the invention. Display 280 may include one or more inputs for displaying data from multiple data sources. The system may include multiple displays, for example, each display simultaneously showing a different model of the same data, for example, for comparison by a viewer. Display 280 may display images produced from data.

Input device 290 may include, for example, a mouse or keyboard operable by a user for entering user input data. Other Input devices may be used. The user may enter data or a command into user fields.

Computing system 230 may include, for example, any suitable processing system, computing system, computing device, processing device, computer, processor, and the like, and may be implemented using any suitable combination of hardware and/or software.

Processor 240 may include, for example, one or more processors, controllers or central processing units ("CPUs"). Software 260 may be stored, for example, all or in part, in memory 250. Software 260 may include any suitable software, for example, for processing or imaging according to embodiments of the present invention. Processor 240 may operate at least partially based on instructions in software 260.

System 200 may, for example, image target geophysical regions, for example, using software 260 and/or processor 240, or other components such as dedicated image or signal processors.

18. Flowchart of a Method for Altering Seismic Data Models

Figure 5:
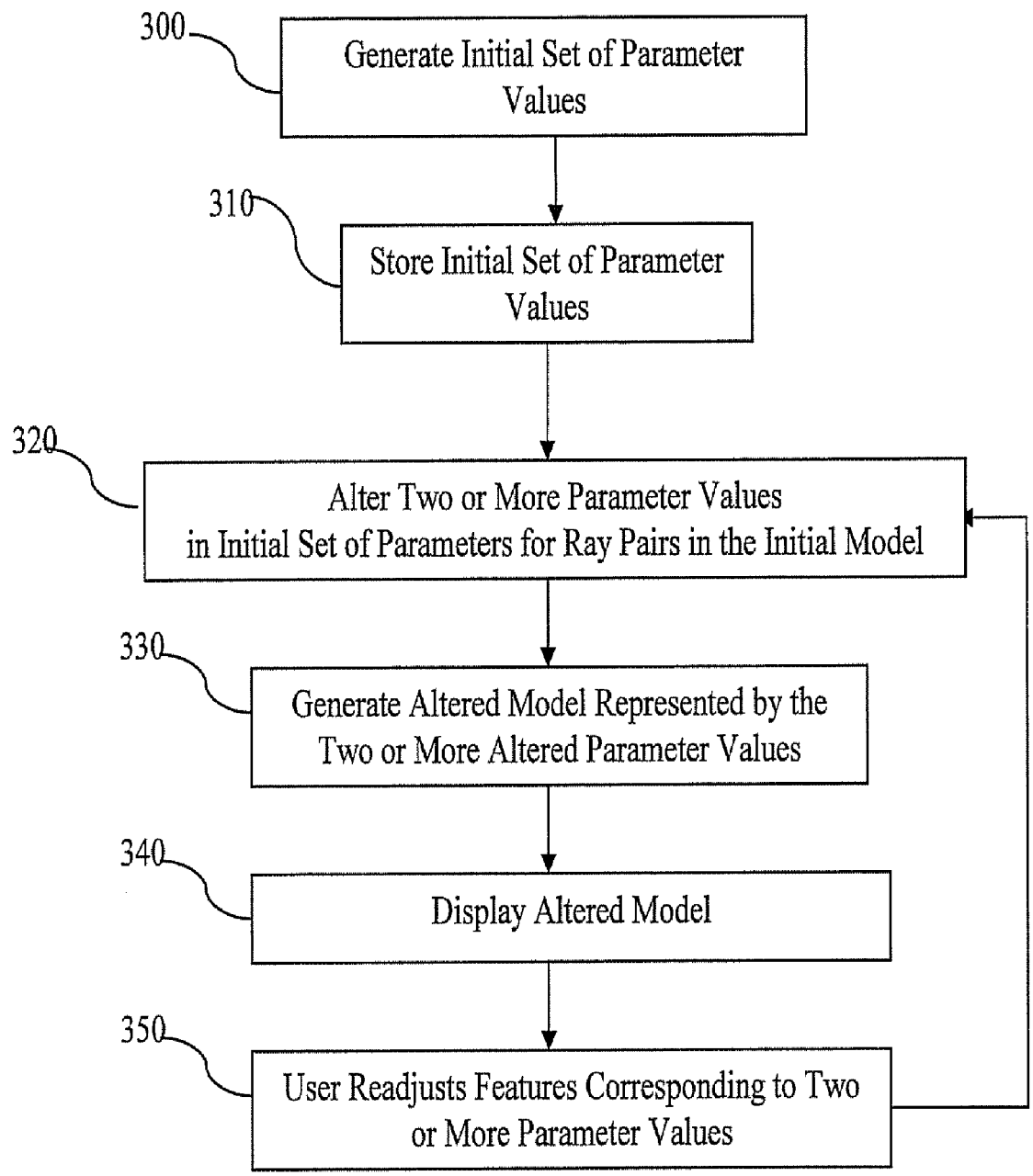
FIG. 5 is a flowchart of a method in accordance with an embodiment of the present invention.

Reference is made to FIG. 5, which is a flowchart of a method in accordance with an embodiment of the present invention.

In operation 300, an initial set of parameter values may be generated. The initial set of parameter values may represent an initial model (e.g., model 100, described in reference to FIG. 1) with a set of seismic data. The set of seismic data may represent a subsurface or geophysical region. The set of seismic data may be acquired using wide azimuth data acquisition methods. Other data, such as data for medical imaging may be used.

A model may be defined by a set of parameter values. A parameter may be a type or kind of property of the model e.g., the locations of interfaces or horizons 110 and properties of the TTI medium, such as, the axial compression velocity. A parameter value is the value for a corresponding parameter for the model (e.g., the value of the parameter at a node 112).

The initial set of parameter values may include, for example, values for the location of a horizon, Thomsen parameters, and the axial compression velocity. The initial set of parameter values may include, for example, tomographic coefficients of the model, generated by ray tracing along ray pairs of the model. Other parameters may be used.

The initial seismic model may be used as a building block to simulate various perturbations or models of the same set of seismic data. The initial seismic model may include multiple ray pairs each having a traveltime. The initial model may have a size and a set of dimensions having a size.

In one embodiment, the initial set of parameter values may be represented in a matrix form (e.g., template matrix, Q, discussed herein) or, for example, as a plurality of matrices (e.g., template matrix, $Q_{ij}$, discussed herein).

The initial set of parameter values may be generated, for example, in processor 240, described in reference to FIG. 4. The initial set of parameter values may be stored in memory 250, described in reference to FIG. 4.

In operation 310, the initial set of parameter values may be stored in memory, for example, memory 250, described in reference to FIG. 4, or another storage device such as a disk drive. The initial set of parameter values may be repeatedly retrieved from memory each time the initial model is used for generating a new altered model of the set of seismic data.

In operation 320, two or more parameter values in the initial set of parameter values may be altered causing residual traveltimes for each of some or all of the ray pairs in the initial model.

The two or more parameter values may be altered in response to a user adjusting a corresponding feature of the model, as described in further detail in operation 350.

Each of the two or more parameter values that are altered (e.g., individually or without altering the remaining of the two or more parameter values) may correspond to a change in the traveltime of each of the altered ray pairs. The two or more parameter values of the model may be altered causing a first and a second nonzero change in the traveltime of each of the ray pairs, respectively. One of the altered parameter values may correspond to an alteration in the traveltime of each of the ray pairs that is equal and opposite to an alteration corresponding to the other two or more altered parameter values.

However, the two or more parameter values may be altered in a complementary manner (e.g., in combination) corresponding to no net change in the traveltime of each of the ray pairs. The first and the second nonzero changes in the traveltime of each of the ray pairs, for example, described herein, may be equal and opposite so that altering the first and second parameter values in combination causes no total change in the traveltime along each of ray pairs. Thus, the traveltime along each ray pair altered may be preserved.

A time preserving tomography mechanism may be used for simulating different perturbations or alterations for some or each of the ray pairs of the initial model. Tomographic coefficients may be calculated for preserving the total traveltime along each of the altered ray pairs. The alteration of the two or more parameter values may be generated in response to user input, for example, via a user interface provided by display 280, described in reference to FIG. 4.

To change the model, typically, the user does not directly change the parameter values of the model. This task would typically be too laborious. Instead, the user may change or manipulate features or definitions of the model by for example changing or entering changes in definitions in user interface fields. User interface fields may allow the changed feature to be a model representation or characteristic viewable to the user. The user interface fields may be displayed to a user (e.g., on a computer display 280). In one example, the user interface fields may be included in the visualization of the model itself. The visualization, which may for example be presented to a user on a monitor, may include adaptable or changeable features, such as the locations of horizons, reflection points, or other spatial model objects, which may be changed by a user to cause the processor to alter the model.

For example, the user may enter a command, highlight, select, drag, and/or click, to move a horizon, reflection point and/or other spatial fields, from one location to another. In another example, the user interface fields may be text, check, box or value fields for entering data for changing a model feature. In one example, the user may check a box to indicate whether the model is isotropic or anisotropic and/or enter a number indicating the desired anisotropic degree of the altered model. In another example, the user may enter a change in the axial compression velocity by 1-2%. The user may, for example, use an input device (e.g., input device 290), such as, a mouse or keyboard.

These changes to model features are typically made locally to a subset or portion of the model 100. For example, the user may change the axial compression velocity by 1-2% in a specific layer or geological formation 114 of the model. However, typically such a local change may result in traveltime changes that cascade throughout the model to affect other layers. Thus, for each local change to a portion of the model, embodiment of the invention provide a mechanism for determining corresponding global changes to other portion of the model for preserve traveltime along all ray pairs throughout the model.

Such local changes to user interface fields may direct or trigger a processor (e.g., processor 240) to change the parameter values of all the globally affected, layers of the model for defining a new model. In this way, the user may easily modify the model by entering changes to model features in user interface fields without concern for determining the residual affects of such changes.

In one embodiment, the user may enter two different sets of changes to the model features. In response, two different models (e.g., representing the same set of seismic data but having different features) may be generated on a user interface, for example, for user comparison. From the different models, the user may select a preferred model.

In one embodiment, the two or more altered parameter values may represent, for example, a change in the position of one or more structure horizons (e.g., from horizons 110 to horizons 110a, described in reference to FIG. 1) of the initial model. In another embodiment, the two or more altered parameter values may represent, for example, a change in medium properties of one or more regions of the initial model (e.g., from isotropic to anisotropic).

In one embodiment, the alteration of the two or more parameter values may be represented in a vector form (e.g., the perturbation vector, X, described herein). When the two or more parameter values for each of the ray pair are represented by the template matrix, Q, the matrix may be right multiplied by the perturbation vector, X. Such multiplication may alter the two or more parameter values. The alterations may be customized to take any form, for example, according to user input.

In operation 330, an altered model may be generated represented by the two or more altered parameter values. Since each model is defined by a set of parameter values, the initial model may be changed to the altered model by altering its set of parameter values.

The altered model may have a size equal to the size of the initial seismic model. In one embodiment, each of the initial model and altered model may have a set of dimensions such that the sizes of the dimensions of the initial model and altered model may be the same. For example, in one embodiment, if the initial model is an n×m matrix, the altered model is also an n×m matrix.

The altered or final set of parameter values defining the altered model and/or the altered model itself, may be stored, for example, in memory 250, or another storage device such as a disk drive.

In operation 340, the altered model may be displayed to a user, for example, on display 280, described in reference to FIG. 4.

In operation 350, a user may readjust features causing the processor to alter two or more parameter values of the initial model to generate a second altered model. The altered features and the corresponding altered parameter values may be different than those used in operation 320. For example, different features may be altered or the same features may be altered in a different manner or degree or to different values. The readjustment may cause the aforementioned operations 320-340 to be repeated for the different two or more parameter values. A corresponding different model perturbation may be simulated. The initial seismic model may be reused as a building block for generating a second altered model of the set of seismic data.

The different models may be compared for selecting the optimum model-building parameter values. The user may repeat or "fine-tune" such readjustments until an accurate model is generated.

Although embodiments described herein, typically refer to altering an initial model to an altered model, it is clear that embodiments of this method may be applied for changing any first model to any second model. For example, a model may be repeatedly altered (e.g., from a first, to a second, to a third, and so on) until a user or automatic control mechanism determines that the model is sufficiently accurate (e.g., based on known checks or testing to be within a predetermined error or variation range). In another example, an altered model may be altered to the initial model, for example, by selecting a reset button in the user interface fields.

Other operations or series of operations may be used.

The initial seismic model and altered model may each have a set of dimensions. The set of dimensions of a model may include spatial or coordinate dimensions, parameter dimensions, and/or other dimensions. The spatial or coordinate dimensions may be defined, for example, by Cartesian coordinates x, y, and z, or polar coordinates. The set of dimensions may correspond to the number or degree of dimension of the model. For example, a 3D model (e.g., a 3D cube or prism) may have three spatial dimensions and a 2D model (e.g., a planar surface or cross-section of a 3D model) may have two spatial dimensions. In one embodiment, the altered model may have the same set of dimensions as the initial model. The set of dimensions for each of the initial model and altered model may have a size. The size of each of the dimensions of a model may correspond to the size of a subsurface volume being modeled in that specific dimension. In one embodiment the altered model may have a set of dimensions having the same size as that of the set of dimensions of the initial model. Other dimensions, sets of dimensions, and/or sizes thereof may be used.

It may be appreciated by those skilled in the art that embodiments of the present invention may be applied to any system involved in seismic data processing and modelling. Embodiments of the present invention may be used for modelling in various areas or fields, such as, for example, exploration and production of oil and gas, imaging of the shallow earth model for environmental study (e.g., using data collected using seismic and/or ground penetration radar (GPR) methods), construction engineering (e.g., to identify locations of pipes), construction safety and security (e.g., to identify holes and channels), medical imaging (e.g., using CT, MRI, and ultra-sound devices), non-destructive material inspection, inspection of internal items for security reasons (e.g., homeland security), marine sonar, antenna and radar systems.

Embodiments of the invention may include a computer readable medium, such as for example a memory, a disk drive, or a flash memory, including instructions which when executed by a processor or controller, carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for the perturbation of a background subsurface model using time preserving tomography, the method comprising:
in a processor:
storing values for an initial set of parameters representing an initial background subsurface model, wherein the initial model corresponds to at least a plurality of ray pairs, each ray pair comprising a traveltime;
generating an altered model by altering values of the individual parameter in the set and, based on linear relationships between perturbations for the individual parameter in the set and perturbations for one or more other parameters in the set, altering values for the one or more other parameters in the set associated with an equal and opposite change in the traveltimes of each of the ray pairs in the initial model, wherein the total traveltime of each of the ray pairs in the altered model is identical to the total traveltime of each of the ray pairs in the initial model.

2. The method of claim 1, wherein at least one of the parameters comprises a position of the structure horizons of the initial model and the altered values for that parameter represent a change in the position of one or more structure horizons of the initial model.

3. The method of claim 1, wherein the altered parameter values represent a change in medium properties of one or more regions of the initial model.

4. The method of claim 1, wherein the time preserving tomography is used for calculating tomographic coefficients for simulating different perturbations of the initial model while preserving the total traveltime along each of the ray pairs.

5. The method of claim 4, wherein the tomographic coefficients of the ray pairs are calculated using the derivatives of the traveltimes of the ray pairs with respect to the altered parameters.

6. The method of claim 1, wherein the initial set of parameter values is represented in a template matrix and the data for altering the parameter values is represented in a vector.

7. The method of claim 6, wherein generating an altered model comprises multiply the template matrix by vector.

8. The method of claim 1, further comprising accepting user input, altering values for the individual parameters in the initial set of parameters according to the user input and altering values for the one or more other parameters in the initial set of parameters in a complementary manner so that there is no net change in traveltime of each of the ray pairs.

9. The method of claim 1, further comprising storing in memory the altered model.

10. A method for the perturbation of a background subsurface model using time preserving tomography, the method comprising:
 in a processor:
  storing values for an initial set of parameters representing an initial background subsurface model of a set of data, wherein the initial model has a size and wherein the initial model corresponds to at least a plurality of ray pairs each ray pair comprising a traveltime;
  altering values for two or more parameters in the initial set of parameters based on linear relationships between perturbations of values of the two or more parameters, wherein altering values for one of the parameters corresponds to an alteration in the traveltime of each of a plurality of the ray pairs, the alteration in traveltime being equal and opposite to an alteration corresponding to the remaining altered parameter values, and wherein the values for the two or more parameters are altered in a complementary manner so that there is no net change in traveltime of each of the ray pairs; and
  generating an altered model of the set of data represented at least in part by the altered parameter values, wherein the altered model has a size equal to the size of the initial model.

11. The method of claim 10, wherein the initial model comprises a first set of dimensions and the altered model comprises a second set of dimensions, wherein the sizes of the first and second sets of dimensions are the same.

12. The method of claim 10, wherein the initial set of the two or more altered parameters comprises one or more subsurface medium parameters and a position of the structure horizons of the initial model and the altered set of parameter values comprises a change in the initial subsurface medium parameter values and in the initial positions of the structure horizons of the initial model.

13. The method of claim 10, wherein the altered parameter values represents a change in medium properties of one or more regions of the initial model.

14. The method of claim 10, wherein the time preserving tomography is used for calculating tomographic coefficients for simulating different perturbations of the initial model while preserving total traveltime along each of the ray pairs.

15. The method of claim 10, further comprising storing in memory the altered model.

16. A method for the perturbation of a background subsurface model, the method comprising:
 in a processor:
  generating a model corresponding to at least a plurality of ray pairs, each ray pair comprising a traveltime;
  altering a value of a first parameter of the model associated with a first nonzero change in the traveltime of each of a plurality of the ray pairs; and
  altering a value of a second parameter of the model based on a linear relationship between perturbations of values of the first and second parameters, wherein altering the value of the second parameter is associated with a second nonzero change in the traveltime of each of the ray pairs,
  wherein the first and the second nonzero change in the traveltime of each of the plurality of ray pairs are equal and opposite so that altering the first and second parameter values causes no total change in the traveltime along each of the plurality of ray pairs.

17. The method of claim 16, wherein the model has a size and wherein altering the parameter values of the model does not alter the size of the model.

18. The method of claim 16, wherein the altered parameter values represents a change in a position of one or more structure horizons of the model.

19. The method of claim 16, wherein the altered parameter values represents a change in medium properties of one or more regions of the model.

20. The method of claim 16, wherein a ray tracing method is used for calculating tomographic coefficients for simulating different perturbations of the model and wherein there is no total change in the traveltime along each of the ray pairs.

21. The method of claim 16, further comprising storing in memory the model.

22. A system for the perturbation of a background subsurface model using time preserving tomography, the system comprising:
 a memory for storing values for an initial set of parameters representing an initial background subsurface model, wherein the initial model corresponds to at least a plurality of ray pairs each ray pair comprising a traveltime; and
 a processor for:
  receiving an instruction to alter values for an individual parameter in the set, wherein altering values for each parameter in the set is associated with a change in the traveltimes of each of a plurality of the ray pairs in the initial model, and
  generating an altered model by altering values of the individual parameter in the set and, based on linear relationships between perturbations for the individual parameter in the set and perturbations for one or more other parameters in the set, altering values for the one or more other parameters in the set associated with an equal and opposite change in the traveltimes of each of the ray pairs in the initial model, wherein when the processor alters the values for the parameters in combination, a total traveltime of each of the plurality of ray pairs in the altered model is equal to the total traveltime of each of the plurality of ray pairs in the initial model.

23. The system of claim 22, wherein at least one of the initial set of parameters comprises the subsurface medium parameter and a position of the structure horizons of the initial model and the altered parameter values represent a change in the initial subsurface medium parameter values and in the initial position of one or more structure horizons of the initial model.

24. The system of claim 22, wherein the altered parameter values represent a change in medium properties of one or more regions of the initial model.

25. The system of claim 22, wherein the processor calculates tomographic coefficients and then uses a tomographic method for simulating different perturbations of the initial model while preserving the total traveltime along each of the ray pairs.

26. The system of claim 22, wherein the memory stores the altered model.

* * * * *